(12) United States Patent
Nishino

(10) Patent No.: US 12,422,549 B2
(45) Date of Patent: Sep. 23, 2025

(54) DISTANCE MEASUREMENT SENSOR

(71) Applicant: Sony Semiconductor Solutions Corporation, Kanagawa (JP)

(72) Inventor: Tatsuki Nishino, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 884 days.

(21) Appl. No.: 17/634,123

(22) PCT Filed: Sep. 11, 2020

(86) PCT No.: PCT/JP2020/034611
§ 371 (c)(1),
(2) Date: Feb. 9, 2022

(87) PCT Pub. No.: WO2021/054269
PCT Pub. Date: Mar. 25, 2021

(65) Prior Publication Data
US 2022/0317298 A1    Oct. 6, 2022

(30) Foreign Application Priority Data

Sep. 18, 2019 (JP) ................................. 2019-169425

(51) Int. Cl.
*G01S 17/10* (2020.01)
*G01S 7/481* (2006.01)
(Continued)

(52) U.S. Cl.
CPC ............ *G01S 17/10* (2013.01); *G01S 7/4817* (2013.01); *G01S 7/4863* (2013.01); *G01S 7/487* (2013.01); *G01S 17/894* (2020.01); *G01S 17/931* (2020.01)

(58) Field of Classification Search
None
See application file for complete search history.

(56) References Cited

U.S. PATENT DOCUMENTS

| 2018/0209846 A1 | 7/2018 | Shingo et al. |
| 2019/0250257 A1 | 8/2019 | Hod et al. |

FOREIGN PATENT DOCUMENTS

| CN | 106210570 A | 12/2016 |
| CN | 108088573 A | 5/2018 |

(Continued)

OTHER PUBLICATIONS

International Search Report (PCT/ISA/210), International Application No. PCT/JP2020/034611, dated Nov. 26, 2020.

*Primary Examiner* — Hovhannes Baghdasaryan
(74) *Attorney, Agent, or Firm* — Michael Best & Friedrich LLP

(57) ABSTRACT

A distance measurement sensor according to the present disclosure includes a single photon avalanche diode (SPAD) element, a first constant current source and a second constant current source, a first switch, a second switch, and a gating switch. The SPAD element outputs a signal at the time of receiving light reflected from a measured object due to light emitted from a light source. The first constant current source and the second constant current source are connected in parallel to a cathode of the SPAD element. The first switch is connected between the SPAD element and the first constant current source. The second switch is connected between the SPAD element and the second constant current source. The gating switch is connected between the SPAD element and the first switch and between the SPAD element and a ground potential.

16 Claims, 19 Drawing Sheets

(51) Int. Cl.
*G01S 7/4863* (2020.01)
*G01S 7/487* (2006.01)
*G01S 17/894* (2020.01)
*G01S 17/931* (2020.01)

(56) References Cited

FOREIGN PATENT DOCUMENTS

| | | |
|---|---|---|
| CN | 109709531 A | 5/2019 |
| CN | 110249624 A | 9/2019 |
| CN | 212321848 U | 1/2021 |
| JP | 2014081254 A | 5/2014 |
| JP | 2015117970 A | 6/2015 |
| JP | 2018179732 A | 11/2018 |
| JP | 2019101023 A | 6/2019 |
| KR | 200329267 Y1 | 10/2003 |
| WO | WO-2007102430 A1 | 9/2007 |
| WO | WO-2019087783 A1 | 5/2019 |

DISTANCE MEASUREMENT SENSOR

TECHNICAL FIELD

The present disclosure relates to a distance measurement sensor.

BACKGROUND ART

As one of distance measurement methods for measuring a distance to a measured object using light, a distance measurement method called a direct ToF (Time of Flight) method is known. In the direct ToF method, light emitted from a light source is reflected by a measured object, the reflected light is received by a light reception element, and a distance to a target is measured on the basis of a time from when the light is emitted to when the light is received as the reflected light (for example, refer to PTL 1).

CITATION LIST

Patent Literature

[PTL 1]
JP 2015-117970 A

SUMMARY

Technical Problem

The present disclosure proposes a distance measurement sensor capable of quickly and properly performing a gating operation of a SPAD element.

Solution to Problem

According to the present disclosure, a light detecting device is provided. The light detecting device comprises an avalanche photodiode, wherein an electrode of the avalanche photodiode is coupled to a first node; a first switch coupled to the first node, and coupled to a first potential line via a first current source; a second switch coupled to the first node, and coupled to the first potential line via a second current source; and a delay circuit coupled to the first switch and the second switch.

Advantageous Effects of Invention

According to the present disclosure, a gating operation of a SPAD element can be performed quickly and properly. Note that the effects described herein are not necessarily limited, and may be any effects described in the present disclosure.

DESCRIPTION OF EMBODIMENTS

Figure 1:
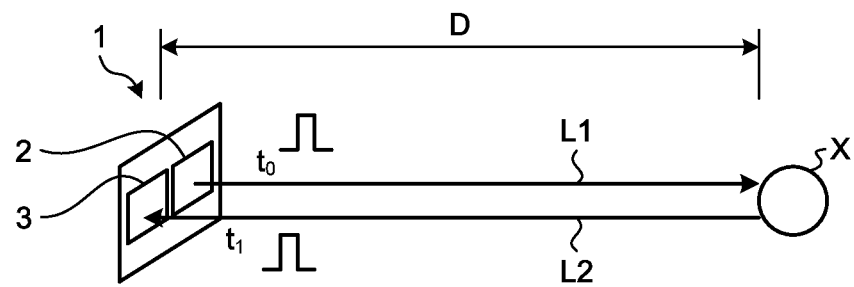
FIG. 1 is a diagram schematically illustrating distance measurement by a direct ToF method applicable to each embodiment of the present disclosure.

Hereinafter, each embodiment of the present disclosure will be described in detail on the basis of the drawings. In the following embodiments, the same portions will be denoted by the same reference numerals, without redundant description.

As one of distance measurement methods for measuring a distance to a measured object using light, a distance measurement method called a direct ToF method is known. In the direct ToF method, light emitted from a light source is reflected by the measured object, the reflected light is received by a light reception element, and a distance to a target is measured on the basis of a time from when the light is emitted to when the light is received as the reflected light.

In the distance measurement method, a light reception element including a single photon avalanche diode (SPAD) element therein is used as a light reception unit. In the SPAD element, there is a predetermined dead time after the light is received and a signal is output. For this reason, in order to reliably receive the reflected light from the measured object and output the signal, the SPAD element is controlled in an invalid state until the light source emits the light.

Then, processing called a gating operation for switching the SPAD element from an invalid state to a valid state in synchronization with a light emission operation of the light source is performed in the distance measurement sensor.

On the other hand, the light emitted from the light source may be reflected by a casing of the distance measurement sensor or the like, and may return as stray light earlier than the reflected light from the measured object. Further, the above-described gating operation may not be performed properly due to the stray light.

This is because the stray light is accumulated as electrons when the stray light is incident on the SPAD element, so that the SPAD element may unintentionally react during the gating operation, due to the accumulated electrons.

In order to improve the problem caused by the accumulated electrons, it is effective to perform the gating operation over a relatively long time. Thereby, since the gating operation can be performed while the accumulated electrons caused by the stray light are eliminated, it is possible to suppress the SPAD element from unintentionally reacting due to the accumulated electrons.

However, since the gating operation takes a long time, a time for the SPAD element to switch from the invalid state to the valid state may also become long. As a result, when there is the measured object near the distance measurement sensor, the SPAD element cannot be switched to the valid state before the reflected light from the measured object reaches the distance measurement sensor. Therefore, it becomes difficult to measure the distance of the measured object near the distance measurement sensor.

Therefore, realization of a distance measurement sensor capable of overcoming the above-described problems and performing the gating operation of the SPAD element quickly and properly is expected.

Distance Measurement Method

The present disclosure relates to technology for performing distance measurement using light. Therefore, in order to facilitate understanding of each embodiment of the present disclosure, a distance measurement method applicable to each embodiment will be described with reference to FIGS. 1 and 2.

FIG. 1 is a diagram schematically illustrating distance measurement by a direct ToF method applicable to each embodiment of the present disclosure. In each embodiment, the direct ToF method is applied as the distance measurement method.

The direct ToF method is a method for receiving reflected light L2 obtained by reflecting emitted light L1 from a light source unit 2 by a measured object X by a light reception unit 3 and performing distance measurement on the basis of a time of a difference between emission timing and reception timing of the light.

The distance measurement sensor 1 includes the light source unit 2 and the light reception unit 3. The light source unit 2 has a light source 4 (refer to FIG. 5) that is, for example, a laser diode, and is driven to emit a laser beam in a pulsed manner.

The light L1 emitted from the light source unit 2 is reflected by the measured object X and is received by the light reception unit 3 as the reflected light L2. The light reception unit 3 includes a pixel array unit 6 (refer to FIG. 5) that converts light into an electric signal by photoelectric conversion, and outputs a signal according to the received light.

Here, a time (light emission timing) when the light source unit 2 emits light is defined as a time $t_0$, and a time (light reception timing) when the reflected light L2 obtained by reflecting the emitted light L1 from the light source unit 2 by the measured object X is received by the light reception unit 3 is defined as a time $t_1$.

If a constant c is defined as a light velocity ($2.9979 \times 10^8$ [m/sec]), a distance D between the distance measurement sensor 1 and the measured object X is calculated by the following mathematical formula (1).

$$D=(c/2)\times(t_1-t_0) \quad (1)$$

The distance measurement sensor 1 may execute the above-described processing repeatedly a plurality of times. Further, the light reception unit 3 may have a plurality of SPAD elements 6a (refer to FIG. 6), and calculate the distance D on the basis of each light reception timing at which the reflected light L2 is received by each SPAD element 6a.

The distance measurement sensor 1 classifies a time $t_m$ (hereinafter, also referred to as a "light reception time $t_m$") from the time $t_0$ of the light emission timing to the light reception timing at which the light is received by the light reception unit 3, on the basis of classes (bins), and generates a histogram.

Figure 2:
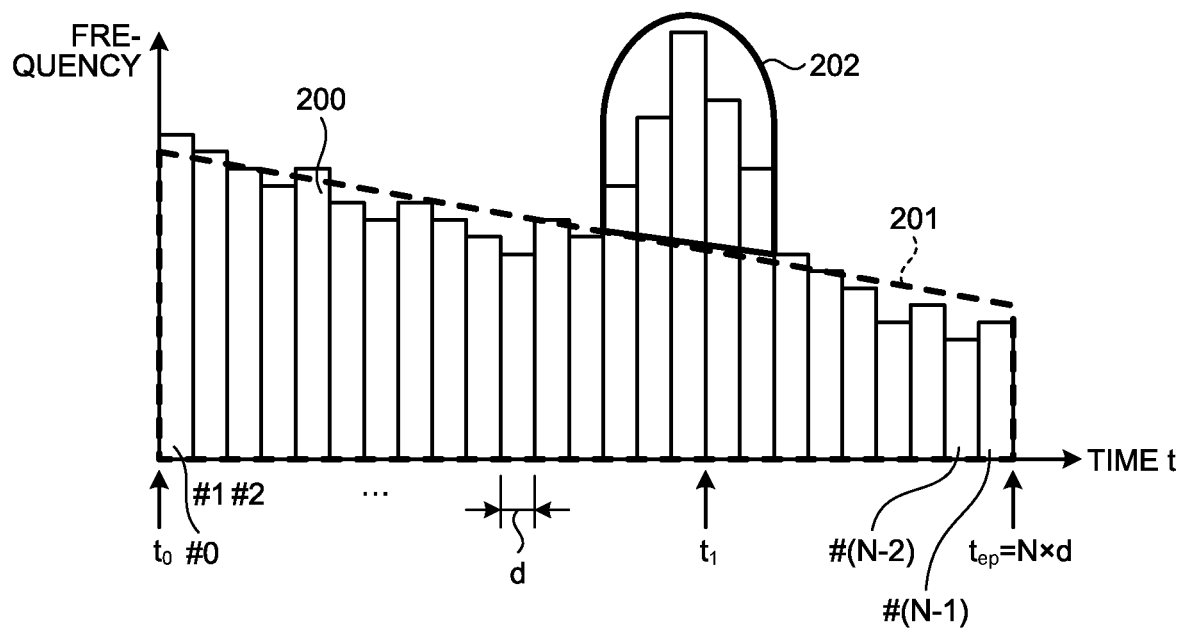
FIG. 2 is a diagram illustrating a histogram of an example based on a time at which light is received by a light reception unit applicable to each embodiment of the present disclosure.

FIG. 2 is a diagram illustrating a histogram of an example based on a time at which light is received by the light reception unit 3 applicable to each embodiment of the present disclosure. In FIG. 2, a horizontal axis represents bins and a vertical axis represents a frequency for each bin. The bin is obtained by classifying the light reception time $t_m$ for each predetermined unit time d.

Specifically, a bin #0 satisfies $0 \leq t_m < d$, a bin #1 satisfies $d \leq t_m < 2 \times d$, a bin #2 satisfies $2 \times d \leq t_m < 3 \times d$, ..., a bin #(N−2) satisfies $(N-2) \times d \leq t_m < (N-1) \times d$. When an exposure time of the light reception unit 3 is defined as a time $t_{ep}$, $t_{ep} = N \times d$ is satisfied.

The distance measurement sensor 1 counts the number of times of acquiring the light reception time $t_m$ on the basis of the bins, obtains a frequency 200 for each bin, and generates a histogram. Here, the light reception unit 3 also receives light other than the reflected light L2 of the light L1 emitted from the light source unit 2.

For example, as an example of the light other than the target reflected light L2, there is ambient light around the distance measurement sensor 1. The ambient light is light that is randomly incident on the light reception unit 3, and an ambient light component 201 due to the ambient light in the histogram becomes noise with respect to the target reflected light L2.

On the other hand, the target reflected light L2 is light received according to a specific distance, and appears as an active light component 202 in the histogram. The bin corresponding to the frequency of a peak in the active light component 202 becomes the bin corresponding to the distance D of the measured object X.

The distance measurement sensor 1 obtains a representative time of the bin (for example, a time at the center of the bin) as the above-described time $t_1$, thereby calculating the distance D to the measured object X, according to the above-described mathematical formula (1). As described above, by using a plurality of light reception results, it is possible to perform appropriate distance measurement for random noise.

Configuration of Electronic Apparatus

Figure 3:
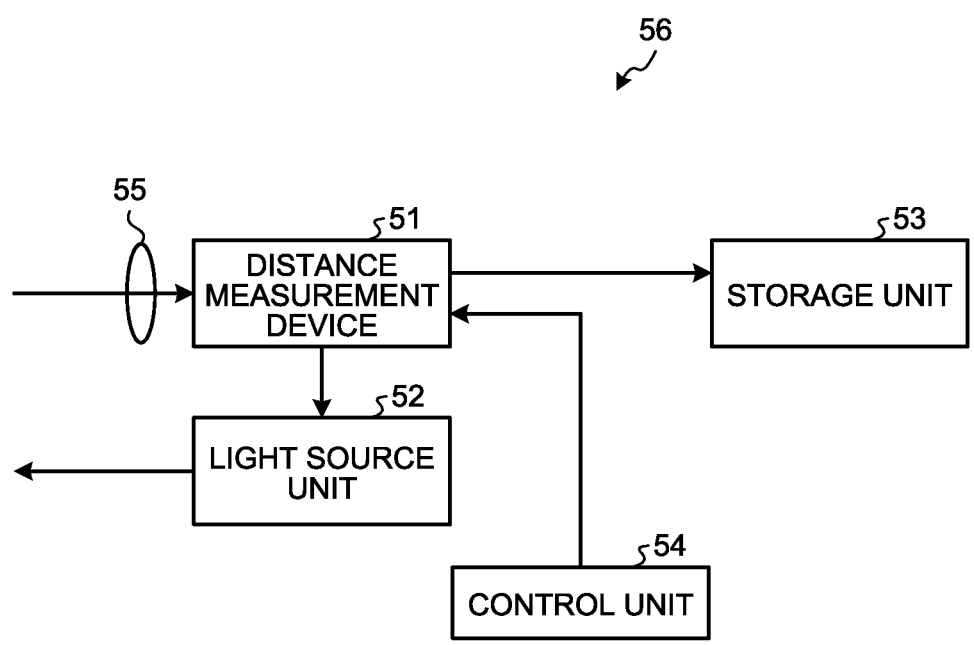
FIG. 3 is a block diagram illustrating a configuration of an example of an electronic apparatus using a distance measurement device according to an embodiment.

FIG. 3 is a block diagram illustrating a configuration of an example of an electronic apparatus using a distance measurement device according to each embodiment. In FIG. 3, an electronic apparatus 56 includes a distance measurement device 51, a light source unit 52, a storage unit 53, a control unit 54, and an optical system 55.

The light source unit 52 that corresponds to the above-described light source unit 2 is a laser diode, and is driven to emit a laser beam in a pulsed manner, for example. As the light source unit 52, a vertical cavity surface emitting LASER (VCSEL) emitting a laser beam as a surface light source can be applied. However, the present disclosure is not limited thereto, and a configuration may be applied as the light source unit 52 in which an array where laser diodes are arrayed on a line is used to scan a laser beam emitted from the laser diode array in a direction perpendicular to the line. Further, a configuration can be applied in which a laser diode as a single light source is used to scan a laser beam emitted from the laser diode in horizontal and vertical directions.

The distance measurement device 51 includes a plurality of light reception elements corresponding to the light reception unit 3 described above. The plurality of light reception elements are arranged, for example, in a two-dimensional lattice to form a light reception surface. The optical system 55 guides light incident from the outside to the light reception surface included in the distance measurement device 51.

The control unit 54 controls an overall operation of the electronic apparatus 56. For example, the control unit 54 supplies, to the distance measurement device 51, a light emission trigger to be a trigger for causing the light source unit 52 to emit light. The distance measurement device 51 causes the light source unit 52 to emit light at timing based on the light emission trigger, and stores a time $t_0$ indicating the light emission timing. Further, the control unit 54 performs setting of a pattern at the time of distance measurement with respect to the distance measurement device 51, according to an instruction from the outside, for example.

The distance measurement device 51 counts the number of times of acquiring time information (light reception time $t_m$) indicating timing at which the light is received by the light reception surface within a predetermined time range, calculates the frequency for each bin, and generates the above-described histogram. Further, the distance measurement device 51 calculates the distance D to the measured object, on the basis of the generated histogram. Information indicating the calculated distance D is stored in the storage unit 53.

Figure 4:
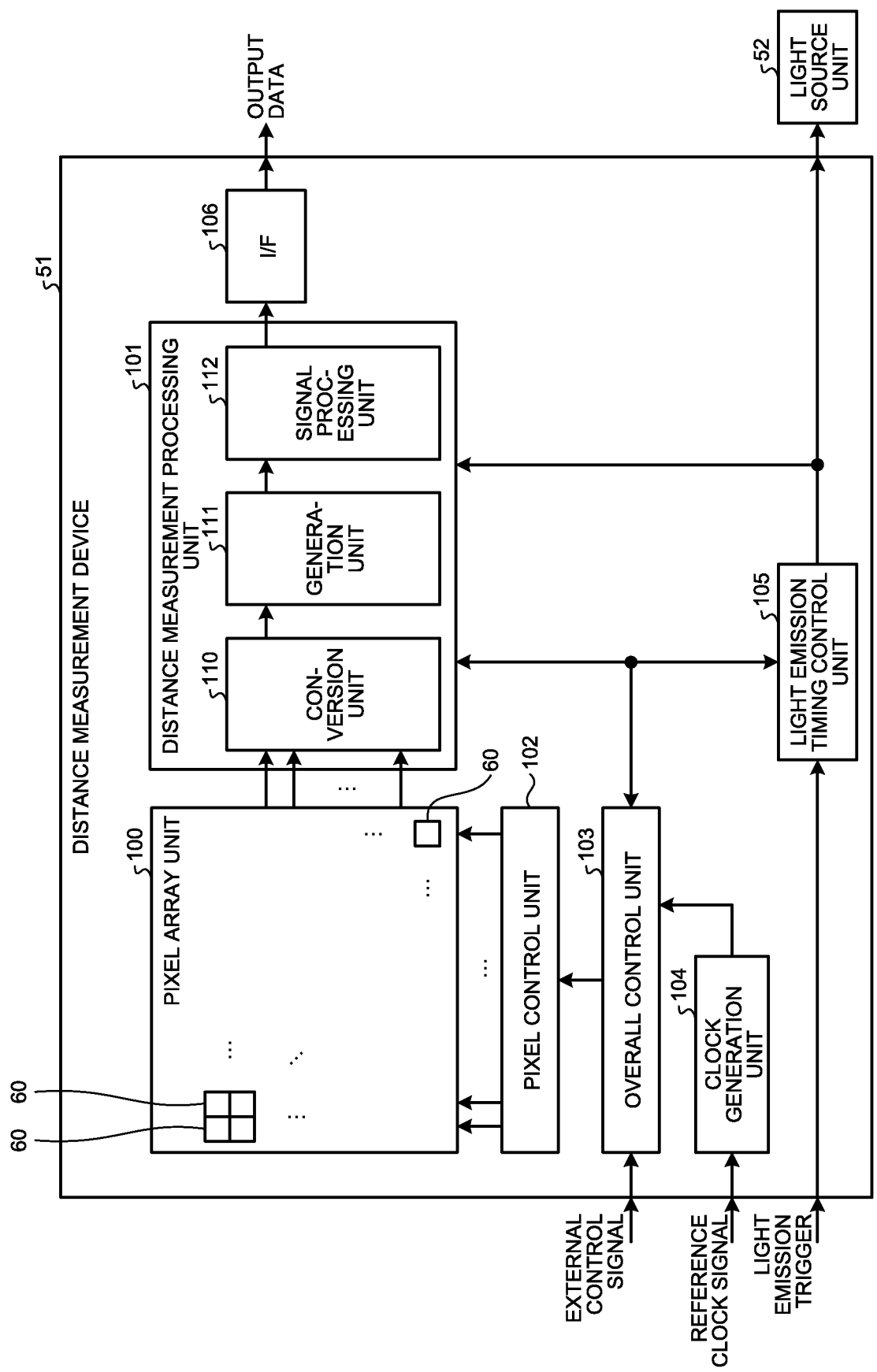
FIG. 4 is a block diagram illustrating a configuration of an example of a distance measurement device applicable to an embodiment in more detail.

FIG. 4 is a block diagram illustrating a configuration of an example of the distance measurement device 51 applicable to each embodiment in more detail. In FIG. 4, the distance measurement device 51 includes a pixel array unit 100, a distance measurement processing unit 101, a pixel control unit 102, an overall control unit 103, a clock generation unit 104, a light emission timing control unit 105, and an interface (I/F) 106. The pixel array unit 100, the distance measurement processing unit 101, the pixel control unit 102, the overall control unit 103, the clock generation unit 104, the light emission timing control unit 105, and the interface (I/F) 106 are disposed on, for example, one semiconductor chip.

In FIG. 4, the overall control unit 103 controls the overall operation of the distance measurement device 51 according to, for example, a program installed in advance. Further, the overall control unit 103 can also execute control according to an external control signal supplied from the outside. The clock generation unit 104 generates one or more clock signals used in the distance measurement device 51, on the basis of a reference clock signal supplied from the outside. The light emission timing control unit 105 generates a light emission control signal indicating light emission timing according to a light emission trigger signal supplied from the outside. The light emission control signal is supplied to the light source unit 52 and is supplied to the distance measurement processing unit 101.

The pixel array unit 100 includes a plurality of pixel circuits 60 each including a light reception element, which are arranged in a two-dimensional lattice. An operation of each pixel circuit 60 is controlled by the pixel control unit 102 according to the instruction of the overall control unit 103. For example, the pixel control unit 102 can control reading of pixel signals from each pixel circuit 60 for each block including (p×q) pixel circuits 60 of p pixel circuits in a row direction and q pixel circuits in a column direction. Further, by scanning each pixel circuit 60 in the row direction in units of blocks and further scanning each pixel circuit 60 in the column direction, the pixel control unit 102 can read the pixel signal from each pixel circuit 60. However, the present disclosure is not limited thereto, and the pixel control unit 102 can control each of the pixel circuits 60 independently. Further, the pixel control unit 102 can use a predetermined region of the pixel array unit 100 as a target region to set the pixel circuit 60 included in the target region as a target pixel circuit 60 from which a pixel signal is to be read. Furthermore, the pixel control unit 102 can scan a plurality of rows (a plurality of lines) collectively, further scan them in the column direction, and read the pixel signal from each pixel circuit 60.

The pixel signal read from each pixel circuit 60 is supplied to the distance measurement processing unit 101. The distance measurement processing unit 101 includes a conversion unit 110, a generation unit 111, and a signal processing unit 112.

The pixel signal that is read from each pixel circuit 60 and is output from the pixel array unit 100 is supplied to the conversion unit 110. Here, the pixel signal is asynchronously read from each pixel circuit 60 and is supplied to the conversion unit 110. That is, the pixel signal is read from the light reception element in accordance with timing at which light is received in each pixel circuit 60, and is output.

The conversion unit 110 converts the pixel signal supplied from the pixel array unit 100 into digital information. That is, the pixel signal supplied from the pixel array unit 100 is output in accordance with timing at which light is received by the light reception element included in the pixel circuit 60 corresponding to the pixel signal. The conversion unit 110 converts the supplied pixel signal into time information indicating the timing.

The generation unit 111 generates a histogram on the basis of the time information into which the pixel signal is converted by the conversion unit 110. Here, the generation unit 111 counts the time information, on the basis of a unit time d set by the setting unit 113, and generates a histogram.

The signal processing unit 112 performs predetermined arithmetic processing, on the basis of data of the histogram generated by the generation unit 111, and calculates distance information, for example. The signal processing unit 112 creates a curve approximation of the histogram, on the basis of the data of the histogram generated by the generation unit 111, for example. The signal processing unit 112 can detect a peak of the curve to which the histogram is approximated, and can calculate the distance D on the basis of the detected peak.

When the curve approximation of the histogram is performed, the signal processing unit 112 can perform filter processing on the curve to which the histogram is approximated. For example, the signal processing unit 112 can suppress a noise component by performing low-pass filter processing on the curve to which the histogram is approximated.

The distance information obtained by the signal processing unit 112 is supplied to the interface 106. The interface 106 outputs the distance information supplied from the signal processing unit 112 to the outside as output data. As the interface 106, for example, a mobile industry processor interface (MIPI) can be applied.

In the above description, the distance information obtained by the signal processing unit 112 is output to the outside via the interface 106, but this is not limited to this example. That is, a configuration may be used in which histogram data to be the data of the histogram generated by the generation unit 111 is output from the interface 106 to the outside. In this case, distance measurement condition information set by the setting unit 113 can omit information indicating a filter coefficient. The histogram data output from the interface 106 is supplied to, for example, an external information processing device, and is appropriately processed.

Configuration of Distance Measurement Sensor

Figure 5:
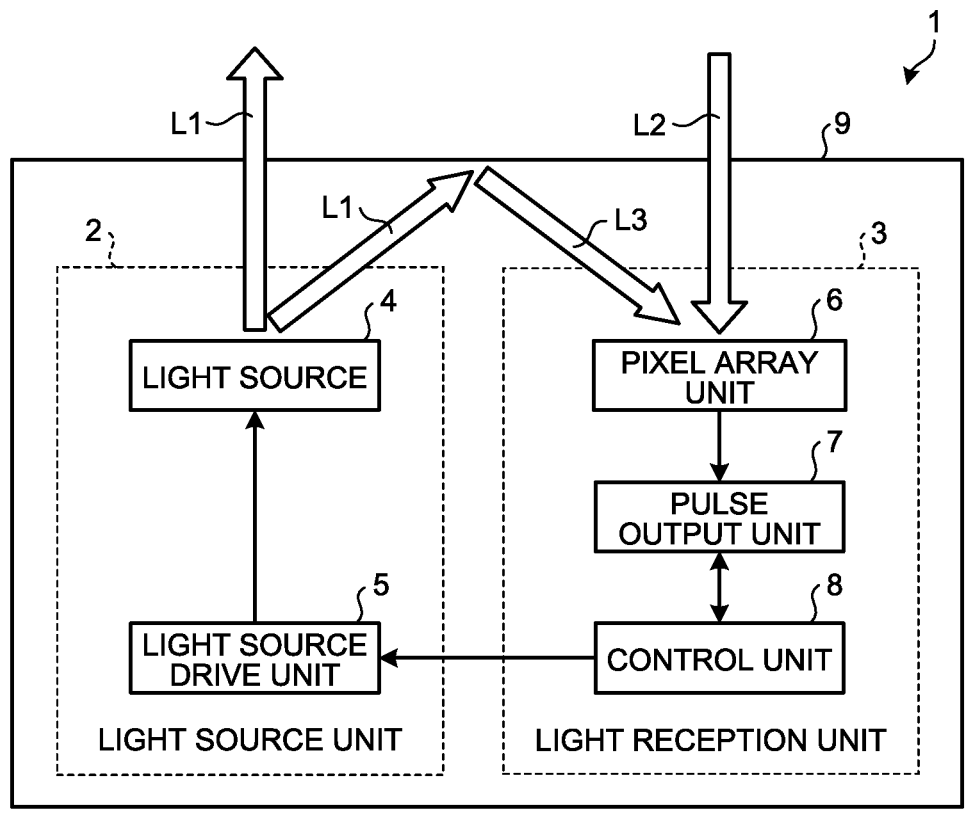
FIG. 5 is a block diagram illustrating a configuration example of a distance measurement sensor according to each embodiment of the present disclosure.

Subsequently, a configuration of the distance measurement sensor 1 according to each embodiment will be described with reference to FIGS. 5 and 6. FIG. 5 is a block diagram illustrating a configuration example of the distance measurement sensor 1 according to each embodiment of the present disclosure. As described above, the distance measurement sensor 1 includes the light source unit 2, the light reception unit 3, and a casing 9.

The light source unit 2 has a light source 4 and a light source drive unit 5. The light source 4 is composed of, for example, a laser diode such as a vertical cavity surface emitting laser (VCSEL). The light source 4 is not limited to the VCSEL, and a laser diode array in which laser diodes are arranged on a line or the like may be used as the light source 4.

The light source drive unit 5 drives the light source 4. The light source drive unit 5 drives the light source 4 so that emitted light L1 having predetermined timing and pulse width is emitted from the light source 4, on the basis of the light emission control signal from the control unit 8 of the light reception unit 3, for example.

The light source drive unit 5 can drive the light source 4 so that the laser beam is scanned in a direction perpendicular to the line from the light source 4 having the laser diodes arranged on the line, for example.

The light reception unit 3 has a pixel array unit 6, a pulse output unit 7, and a control unit 8.

The pixel array unit 6 has a plurality of SPAD elements 6a (refer to FIG. 6) arranged in a two-dimensional lattice. In the SPAD element 6a, by applying a large reverse bias voltage at which avalanche multiplication occurs to the cathode, the avalanche multiplication occurs internally due to electrons generated according to the incidence of one photon.

That is, the SPAD element 6a has a characteristic that a large current flows according to the incidence of one photon. Further, in the SPAD element 6a, the incidence of one photon included in the reflected light L2 can be detected with high sensitivity by using the above characteristic.

The operations of the plurality of SPAD elements 6a in the pixel array unit 6 are controlled by the control unit 8. For example, the control unit 8 can control reading of a signal from each SPAD element 6a for each block including (n×m) SPAD elements 6a of n pixels in the row direction and m pixels in the column direction.

Further, by scanning each SPAD element 6a in the row direction in units of blocks and scanning each SPAD element 6a in the column direction for each row, the control unit 8 can read the signal from each SPAD element 6a.

In each embodiment, the control unit 8 may read a signal from each SPAD element 6a independently. The signal generated by the SPAD element 6a of the pixel array unit 6 is supplied to the pulse output unit 7.

The pulse output unit 7 outputs a predetermined pulse signal as a digital signal to the control unit 8, according to the signal generated by the SPAD element 6a. The details of the pulse output unit 7 will be described later.

The control unit 8 controls the overall operation of the distance measurement sensor 1, according to, for example, a program installed in advance. For example, the control unit 8 controls the light emission timing of the light source 4 by controlling the light source drive unit 5.

Further, the control unit 8 generates the histogram illustrated in FIG. 2, on the basis of the pulse signal output from the pulse output unit 7. Further, the control unit 8 performs predetermined arithmetic processing on the basis of the data of the generated histogram, and calculates the distance D to the measured object X.

The casing 9 accommodates the light source unit 2 and the light reception unit 3. On the other hand, as illustrated in FIG. 3, if the emitted light L1 is reflected by the casing 9, it may be incident on the pixel array unit 6 of the light reception unit 3 as stray light L3. Then, the stray light L3 is incident on the pixel array unit 6 earlier than the reflected light L2 from the measured object X.

Figure 6:
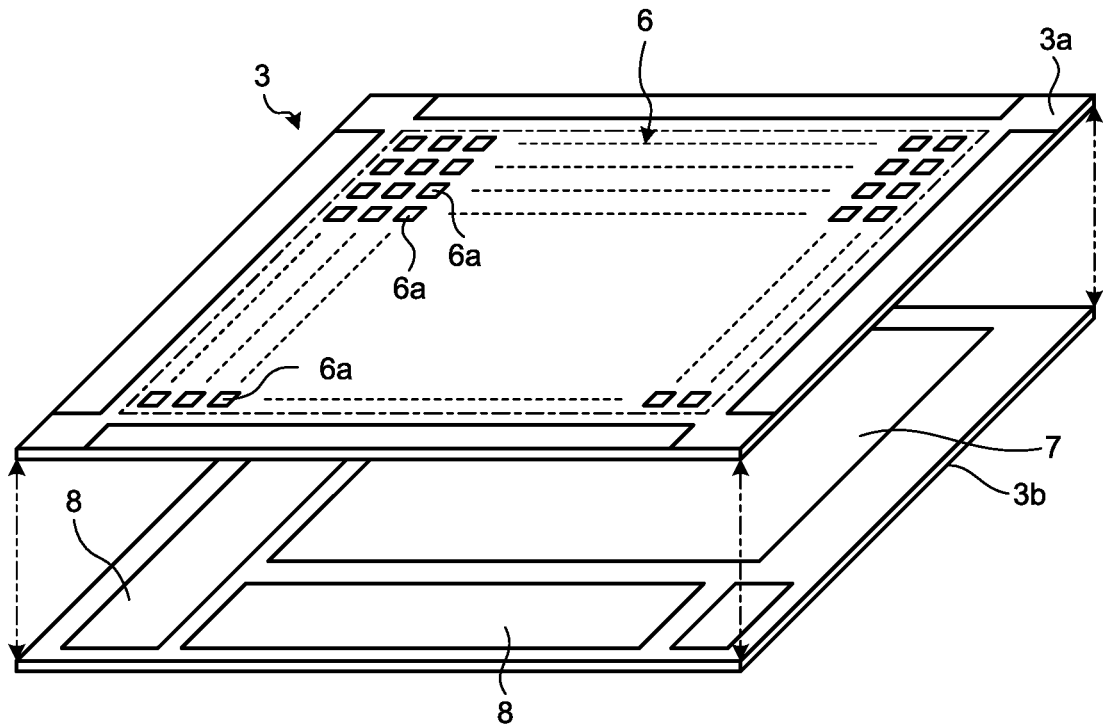
FIG. 6 is a schematic diagram illustrating an example of a configuration of a device applicable to a light reception unit according to each embodiment of the present disclosure.

FIG. 6 is a schematic diagram illustrating an example of a configuration of a device applicable to the light reception unit 3 according to each embodiment of the present disclosure. In FIG. 6, the light reception unit 3 is configured by laminating a light reception chip 3a and a logic chip 3b each formed of a semiconductor chip. FIG. 6 illustrates the light reception chip 3a and the logic chip 3b in a separated state for easy understanding.

In the light reception chip 3a, the SPAD elements 6a are arranged in a two-dimensional lattice in a region of the pixel array unit 6. The logic chip 3b is provided with a pulse output unit 7 and a control unit 8. The configurations of the light reception chip 3a and the logic chip 3b are not limited to the example of FIG. 6.

Configuration and Operation of Pulse Output Unit
(First Embodiment)

Figure 7:
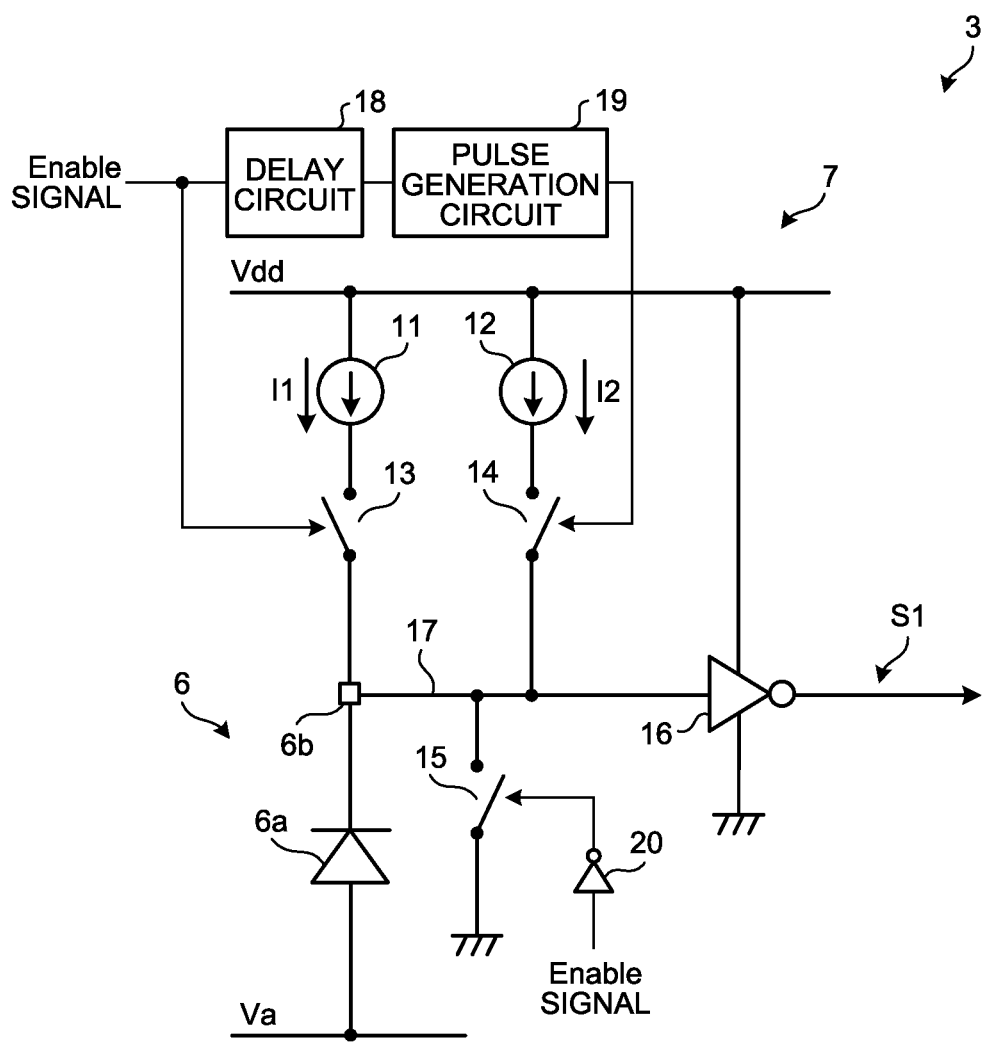
FIG. 7 is a circuit diagram illustrating a configuration example of a pulse output unit according to a first embodiment of the present disclosure.

Subsequently, a configuration and an operation of the pulse output unit 7 according to the first embodiment will be described with reference to FIGS. 7 to 10. FIG. 7 is a circuit diagram illustrating a configuration example of the pulse output unit 7 according to the first embodiment of the present disclosure.

As illustrated in FIG. 7, the pulse output unit 7 has a first constant current source 11, a second constant current source 12, a first switch 13, a second switch 14, a gating switch 15, and an inverter 16.

The first constant current source 11 is connected between a predetermined power supply voltage Vdd and the first switch 13, and flows a current having a predetermined current value I1 to the first switch 13. The second constant current source 12 is connected between the power supply voltage Vdd and the second switch 14, and flows a current having a predetermined current value I2 to the second switch 14.

The first switch 13 is connected between the first constant current source 11 and a signal line 17, and the second switch 14 is connected between the second constant current source 12 and the signal line 17. The signal line 17 connects a cathode of the SPAD element 6*a*, which is a diode, and an input terminal of the inverter 16 via a connection unit 6*b* of the pixel array unit 6.

That is, in the pulse output unit 7 according to the first embodiment, the first constant current source 11 and the second constant current source 12 are connected in parallel to the cathode of the SPAD element 6*a* via the first switch 13 and the second switch 14, respectively.

Then, the first constant current source 11 and the second constant current source 12 flow the currents of the current value I1 and the current value I2 to the cathode of the SPAD element 6*a*, respectively. An anode of the SPAD element 6*a* is connected to a predetermined voltage Va, and an output terminal of the inverter 16 is connected to the control unit 8 (refer to FIG. 5).

Here, the control unit 8 controls an amount of current flowing to the cathode of the SPAD element 6*a* by controlling the first switch 13 and the second switch 14. The first switch 13 and the second switch 14 switch between an on state (conductive state) and an off state (disconnected state), on the basis of an enable signal output from the control unit 8.

Specifically, the enable signal is directly input to the first switch 13. That is, when the enable signal switches from off to on, the first switch 13 switches from off to on immediately.

Further, the enable signal is input to the second switch 14 via a delay circuit 18 and a pulse generation circuit 19. That is, when the enable signal switches from off to on, the second switch 14 switches from off to on during a predetermined period after a predetermined time elapses.

The gating switch 15 is connected between the signal line 17 and a ground potential. That is, the gating switch 15 is connected between the SPAD element 6*a* and the first switch 13 and between the SPAD element 6*a* and the ground potential.

The gating switch 15 switches between an on state and an off state, on the basis of the enable signal output from the control unit 8. Specifically, the enable signal is input to the gating switch 15 via the inverter 20.

That is, when the enable signal switches from off to on, the gating switch 15 switches from on to off immediately.

Then, the control unit 8 can perform the gating operation of the SPAD element 6*a* by controlling the gating switch 15.

For example, the control unit 8 can ground the cathode of the SPAD element 6*a* by turning on the gating switch 15. As a result, the reverse bias voltage is not applied to the SPAD element 6*a*, so that the control unit 8 can cause the SPAD element 6*a* to enter an invalid state.

On the other hand, the control unit 8 can cause the cathode of the SPAD element 6*a* to enter a floating state by turning off the gating switch 15. As a result, the reverse bias voltage can be applied to the SPAD element 6*a*, so that the control unit 8 can cause the SPAD element 6*a* to enter a valid state.

Figure 8:
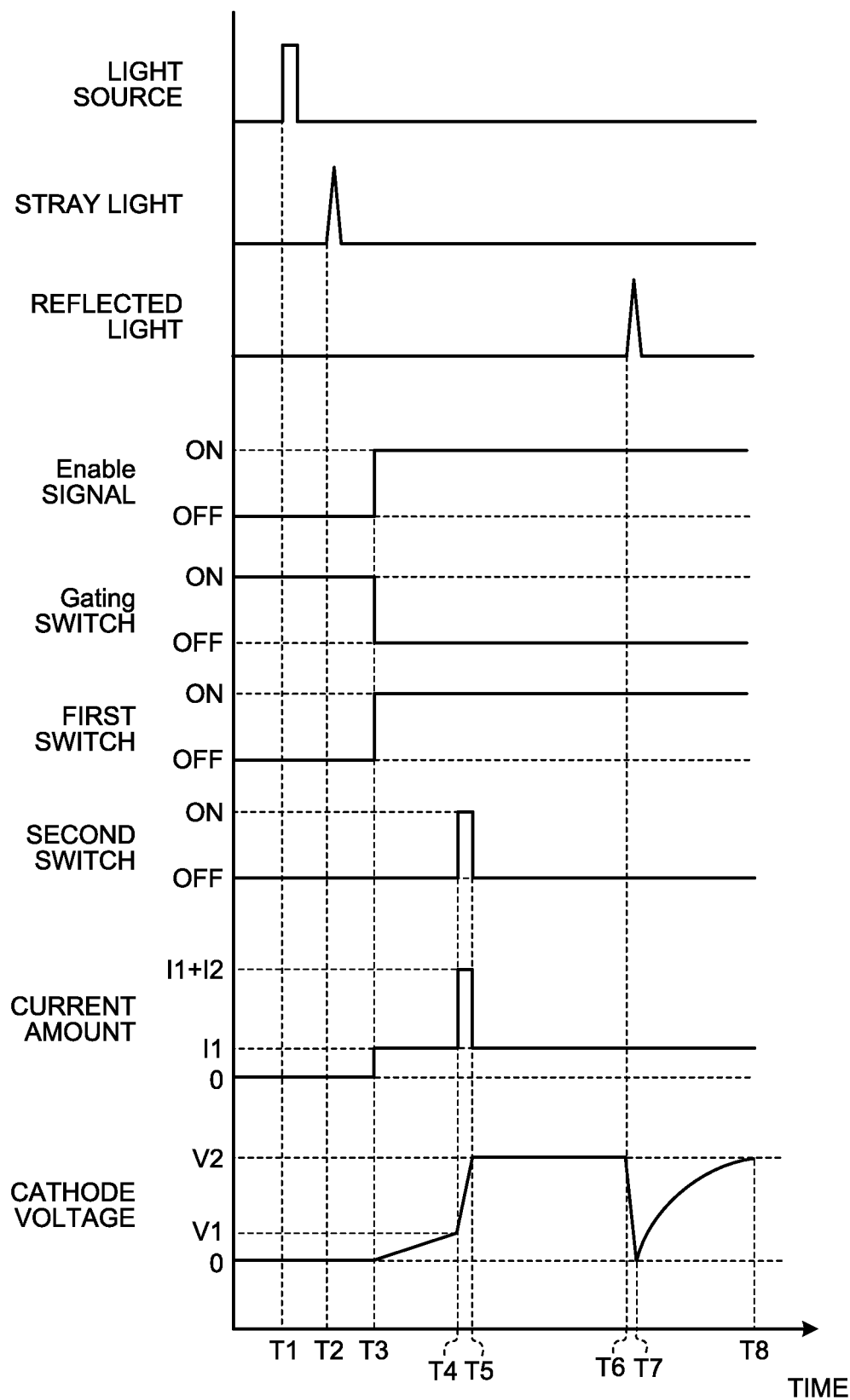
FIG. 8 is a timing chart illustrating an operation example of a pulse output unit according to the first embodiment of the present disclosure.

Next, the operation of the pulse output unit 7 according to the first embodiment will be described with reference to FIG. 8 in addition to FIG. 7. FIG. 8 is a timing chart illustrating an operation example of the pulse output unit 7 according to the first embodiment of the present disclosure.

In the example of FIG. 8, since the enable signal is maintained in the off state in an initial state, the gating switch 15 is maintained in the on state, and the SPAD element 6*a* enters the invalid state.

Then, the control unit 8 controls the light source drive unit 5 to cause the light source 4 to emit light in a pulsed manner at a time T1. As a result, the stray light L3 is incident on the SPAD element 6*a* at a time T2. As illustrated in FIG. 8, the stray light L3 is incident on the SPAD element 6*a* earlier than the reflected light L2 from the measured object X.

The stray light L3 is incident on the SPAD element 6*a*, so that electrons are accumulated in the SPAD element 6*a* in the invalid state.

Next, the control unit 8 switches the enable signal from off to on at a time T3 at which a predetermined time has elapsed from the time T1 when the light source 4 emits light. As a result, the gating switch 15 switches from on to off at the time T3, and the cathode of the SPAD element 6*a* enters a floating state.

Further, the first switch 13 switches from off to on at the time T3. As a result, the current having the current value I1 is supplied from the first constant current source 11 to the cathode of the SPAD element 6*a*, so that a cathode voltage of the SPAD element 6*a* gradually increases from 0 (V).

As described above, in the first embodiment, after starting the gating operation, the cathode of the SPAD element 6*a* is boosted by using one (the first constant current source 11) of the plurality of constant current sources connected in parallel to the cathode of the SPAD element 6*a*.

Thereby, a speed at which the cathode of the SPAD element 6*a* is boosted can be limited. Therefore, according to the first embodiment, since the gating operation can be performed while the electrons accumulated in the SPAD element 6*a* are eliminated, it is possible to suppress the SPAD element 6*a* from unintentionally reacting due to the accumulated electrons.

Then, the enable signal sent from the control unit 8 is sent to the second switch 14 via the delay circuit 18 and the pulse generation circuit 19 as described above. As a result, the second switch 14 switches from off to on at a time T4 at which a predetermined delay time has elapsed from the time T3.

Thereby, a current having a current value I1+I2 is supplied from the first constant current source 11 and the second constant current source 12 to the cathode of the SPAD element 6*a*, so that the cathode voltage of the SPAD element 6*a* rapidly increases from a voltage V1 at a point of time of the time T4.

Then, the voltage reaches a predetermined voltage V2 at a time T5, and the second switch 14 switches from on to off at the time T5. Thereafter, the current having the current value I1 is supplied from the first constant current source 11 to the cathode of the SPAD element 6a, so that the cathode voltage of the SPAD element 6a is maintained at the voltage V2.

As described above, in the first embodiment, the accumulated electrons in the SPAD element 6a can be sufficiently eliminated during a period until the time T4. In other words, in the first embodiment, a time in which the electrons accumulated in the SPAD element 6a can be sufficiently eliminated is set to a delay time set by the delay circuit 18.

Thereby, even if the cathode voltage of the SPAD element 6a is rapidly increased from the time T4, it is possible to suppress the SPAD element 6a from unintentionally reacting.

Furthermore, in the first embodiment, a time until the cathode voltage of the SPAD element 6a becomes the voltage V2 can be reduced by boosting the cathode of the SPAD element 6a using any of the plurality of constant current sources from the time T4. That is, in the first embodiment, the gating operation can be completed in a short time.

Therefore, according to the first embodiment, the plurality of constant current sources are connected in parallel to the cathode of the SPAD element 6a, so that the gating operation of the SPAD element 6a can be performed quickly and properly.

Further, in the first embodiment, the current value I1 of the first constant current source 11 may be smaller than the current value I2 of the second constant current source 12. Thereby, it is possible to further limit the boosting speed of the cathode of the SPAD element 6a until the time T4 when the second switch 14 is turned on. Further, from the time T4 when the second switch 14 is turned on, the cathode voltage of the SPAD element 6a can be more rapidly increased.

Therefore, according to the first embodiment, the gating operation of the SPAD element 6a can be performed more quickly and properly.

Further, in the first embodiment, the control unit 8 may maintain the first switch 13 in the on state during a period until the second switch 14 is switched from off to on (that is, a period until the time T4).

As a result, the cathode voltage of the SPAD element 6a can be continuously increased until the time T4, so that the time until the voltage of the cathode of the SPAD element 6a is increased to the voltage V2 can be reduced. Therefore, according to the first embodiment, the gating operation of the SPAD element 6a can be performed more quickly.

The description of the timing chart after the time T5 will be continued. At the time T5, the reverse bias voltage V2 is applied to the cathode of the SPAD element 6a until a state called a Geiger mode occurs, which is just before avalanche amplification occurs.

That is, at the time T5, the signal output from the cathode of SPAD element 6a has the voltage V2. Then, since the voltage V2 equal to or larger than a predetermined threshold voltage is input as a signal to the inverter 16, the inverter 16 outputs a low-level signal S1 (refer to FIG. 7).

Then, if one photon caused by the reflected light L2 is incident on the SPAD element 6a to which the voltage V2 is applied at a time T6, the SPAD element 6a breaks down and a current flows to the first constant current source 11.

As a result, the cathode voltage of the SPAD element 6a rapidly decreases from the voltage V2, and when the cathode voltage becomes smaller than the threshold voltage, the inverter 16 outputs the high-level signal S1.

Then, since the avalanche amplification in the SPAD element 6a stops at a time T7, the cathode voltage of the SPAD element 6a stops decreasing at 0 (V). Further, the cathode voltage of the SPAD element 6a increases when the SPAD element 6a is recharged by the first constant current source 11 (so-called quenching operation).

Then, if the cathode voltage of the SPAD element 6a becomes equal to or larger than the threshold voltage, the inverter 16 outputs the low-level signal S1.

As described above, if the reflected light L2 is incident on the SPAD element 6a, the inverter 16 outputs the pulse signal S1 resulting from the reflected light L2 to the control unit 8. Finally, the cathode voltage of the SPAD element 6a returns to the predetermined voltage V2 at a time T8, and the SPAD element 6a returns to the initial state.

Figure 9:
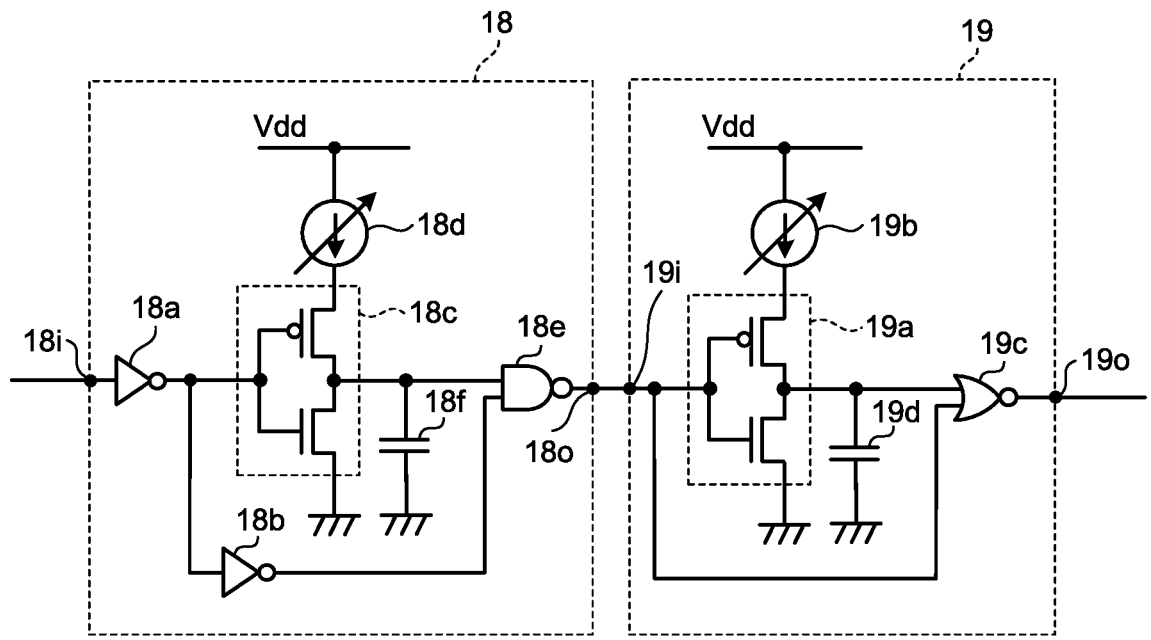
FIG. 9 is a circuit diagram illustrating a configuration example of a delay circuit and a pulse generation circuit according to the first embodiment of the present disclosure.

FIG. 9 is a circuit diagram illustrating a configuration example of the delay circuit 18 and the pulse generation circuit 19 according to the first embodiment of the present disclosure. As illustrated in FIG. 9, the delay circuit 18 has inverters 18a and 18b, a CMOS circuit 18c, a constant current source 18d, a NAND circuit 18e, and a capacitor 18f.

An input terminal 18i of the delay circuit 18 is connected to an input terminal of the inverter 18a. An output terminal of the inverter 18a is connected to an input terminal of the CMOS circuit 18c and an input terminal of the inverter 18b.

A predetermined current is supplied to the CMOS circuit 18c by the constant current source 18d. An output terminal of the CMOS circuit 18c is connected to one input terminal of the NAND circuit 18e.

The other input terminal of the NAND circuit 18e is connected to an output terminal of the inverter 18b. An output terminal of the NAND circuit 18e is connected to an output terminal 18o of the delay circuit 18. The capacitor 18f is connected between an output terminal of the CMOS circuit 18c and a ground potential.

In the circuit configuration described above, a delay time of the delay circuit 18 can be controlled by appropriately adjusting a current value of the constant current source 18d and a capacitance value of the capacitor 18f.

The pulse generation circuit 19 has a CMOS circuit 19a, a constant current source 19b, an exclusive OR circuit 19c, and a capacitor 19d. An input terminal 19i of the pulse generation circuit 19 is connected to an input terminal of the CMOS circuit 19a and is connected to one input terminal of the exclusive OR circuit 19c.

A predetermined current is supplied to the CMOS circuit 19a by the constant current source 19b. An output terminal of the CMOS circuit 19a is connected to the other input terminal of the exclusive OR circuit 19c.

An output terminal of the exclusive OR circuit 19c is connected to an output terminal 19o of the pulse generation circuit 19. The capacitor 19d is connected between an output terminal of the CMOS circuit 19a and a ground potential.

In the circuit configuration described above, a length of a pulse output from the pulse generation circuit 19 can be controlled by appropriately adjusting a current value of the constant current source 19b and a capacitance value of the capacitor 19d.

Figure 10:
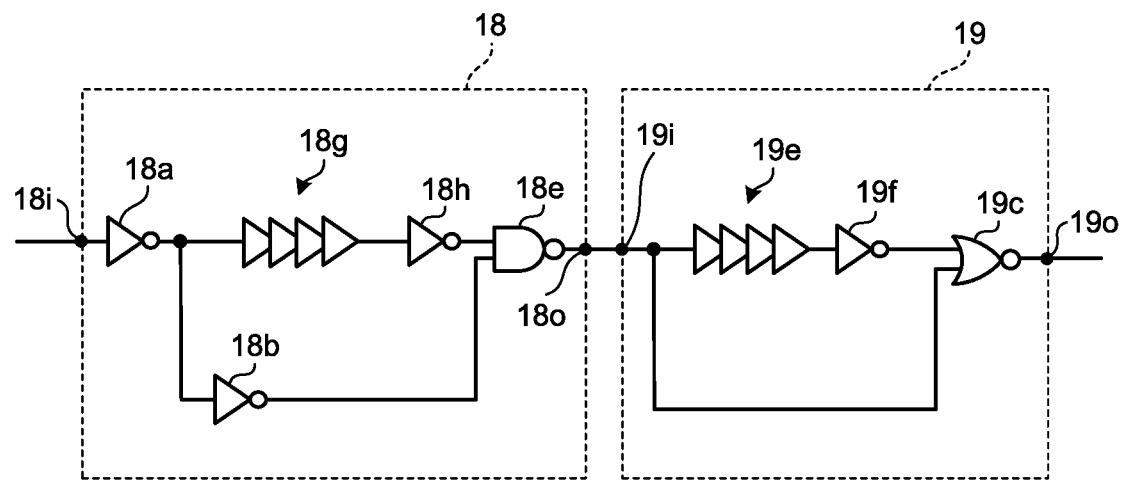
FIG. 10 is a circuit diagram illustrating another configuration example of a delay circuit and a pulse generation circuit according to the first embodiment of the present disclosure.

The circuit configurations of the delay circuit 18 and the pulse generation circuit 19 are not limited to the example in FIG. 9. FIG. 10 is a circuit diagram illustrating another configuration example of the delay circuit 18 and the pulse generation circuit 19 according to the first embodiment of the present disclosure.

In the example of FIG. 10, the delay circuit 18 has inverters 18a, 18b, and 18h, a NAND circuit 18e, and an inverter group 18g.

An input terminal 18*i* of the delay circuit 18 is connected to an input terminal of the inverter 18*a*. An output terminal of the inverter 18*a* is connected to an input terminal of the inverter group 18*g* and an input terminal of the inverter 18*b*.

The inverter group 18*g* has an even number (four in the figure) of inverters connected in series. An output terminal of the inverter group 18*g* is connected to an input terminal of the inverter 18*h*. An output terminal of the inverter 18*h* is connected to one input terminal of the NAND circuit 18*e*.

The other input terminal of the NAND circuit 18*e* is connected to an output terminal of the inverter 18*b*. An output terminal of the NAND circuit 18*e* is connected to an output terminal 18*o* of the delay circuit 18.

In the circuit configuration described above, the delay time of the delay circuit 18 can be controlled by appropriately adjusting the number of the inverter group 18*g*.

The pulse generation circuit 19 has an exclusive OR circuit 19*c*, an inverter group 19*e*, and an inverter 19*f*. An input terminal 19*i* of the pulse generation circuit 19 is connected to an input terminal of the inverter group 19*e* and is connected to one input terminal of the exclusive OR circuit 19*c*.

The inverter group 19*e* has an even number (four in the figure) of inverters connected in series. An output terminal of the inverter group 19*e* is connected to an input terminal of the inverter 19*f*. An output terminal of the inverter 19*f* is connected to the other input terminal of the exclusive OR circuit 19*c*. An output terminal of the exclusive OR circuit 19*c* is connected to an output terminal 19*o* of the pulse generation circuit 19.

In the circuit configuration described above, a length of a pulse output from the pulse generation circuit 19 can be controlled by appropriately adjusting the number of the inverter group 19*e*.

Second Embodiment

Figure 11:
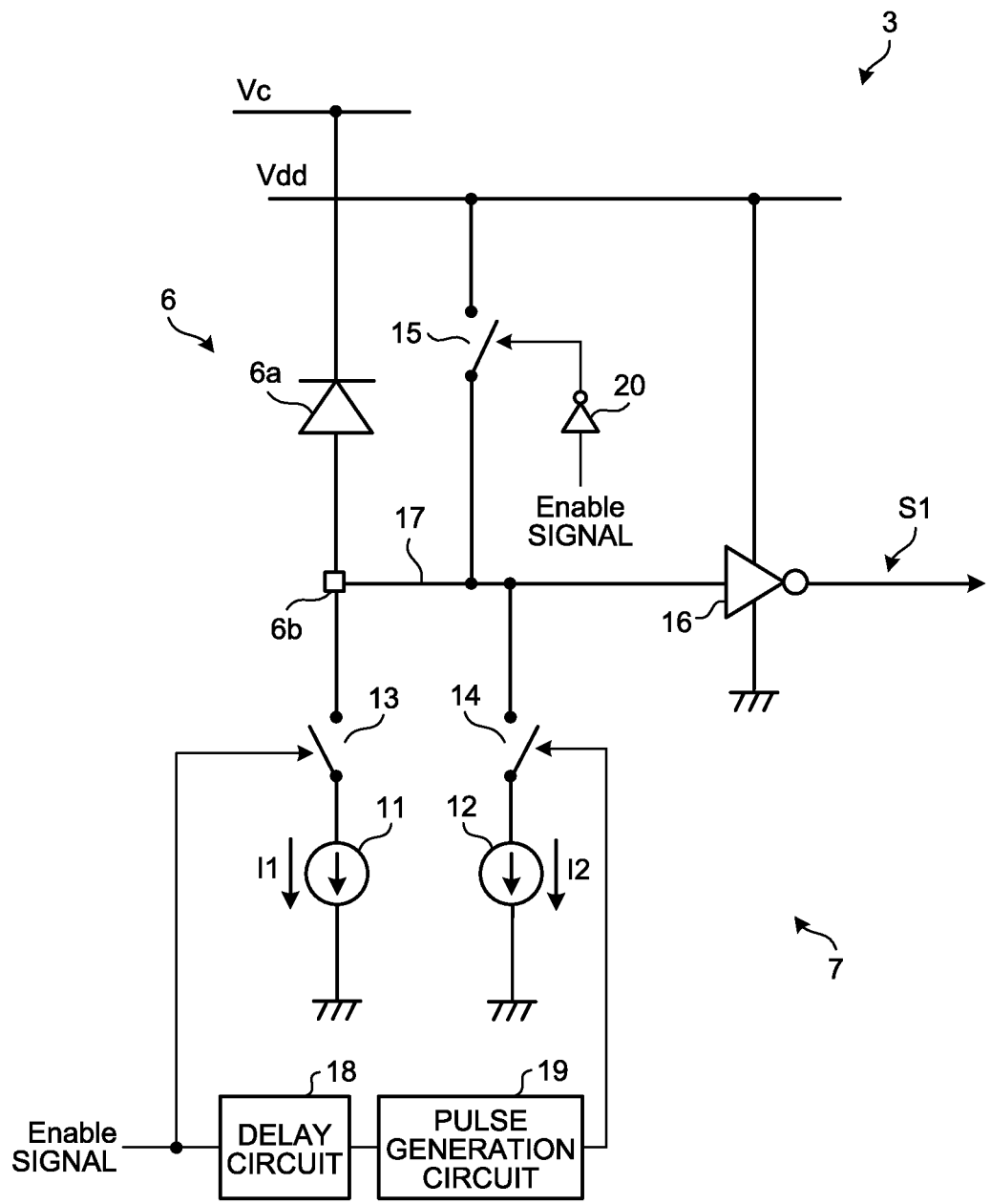
FIG. 11 is a circuit diagram illustrating a configuration example of a pulse output unit according to a second embodiment of the present disclosure.

Subsequently, a configuration and an operation of a pulse output unit 7 according to a second embodiment will be described with reference to FIGS. 11 and 12. FIG. 11 is a circuit diagram illustrating a configuration example of the pulse output unit 7 according to the second embodiment of the present disclosure.

As illustrated in FIG. 11, the pulse output unit 7 has a first constant current source 11, a second constant current source 12, a first switch 13, a second switch 14, a gating switch 15, and an inverter 16.

The first constant current source 11 is connected between the first switch 13 and the ground potential, and flows a current having a predetermined current value I1 to the ground potential. The second constant current source 12 is connected between the second switch 14 and the ground potential, and flows a current having a predetermined current value I2 to the ground potential.

The first switch 13 is connected between the first constant current source 11 and a signal line 17, and the second switch 14 is connected between the second constant current source 12 and the signal line 17. The signal line 17 connects an anode of a SPAD element 6*a* and an input terminal of the inverter 16 via a connection unit 6*b* of a pixel array unit 6.

That is, in the pulse output unit 7 according to the second embodiment, the first constant current source 11 and the second constant current source 12 are connected in parallel to the anode of the SPAD element 6*a* via the first switch 13 and the second switch 14, respectively.

Then, the first constant current source 11 and the second constant current source 12 flow currents of the current values I1 and I2 from the anode of the SPAD element 6*a* to the ground potential, respectively. A cathode of the SPAD element 6*a* is connected to a predetermined voltage Vc, and an output terminal of the inverter 16 is connected to a control unit 8 (refer to FIG. 5).

Here, the control unit 8 controls an amount of current flowing from the anode of the SPAD element 6*a* by controlling the first switch 13 and the second switch 14. The first switch 13 and the second switch 14 switch between an on state and an off state, on the basis of an enable signal output from the control unit 8.

Specifically, the enable signal is directly input to the first switch 13. That is, when the enable signal switches from off to on, the first switch 13 switches from off to on immediately.

Further, the enable signal is input to the second switch 14 via a delay circuit 18 and a pulse generation circuit 19. That is, when the enable signal switches from off to on, the second switch 14 switches from off to on during a predetermined period after a predetermined time elapses. The same circuits as those in the first embodiment can be used for the delay circuit 18 and the pulse generation circuit 19.

The gating switch 15 is connected between the signal line 17 and the power supply voltage Vdd. That is, the gating switch 15 is connected between the SPAD element 6*a* and the first switch 13 and between the SPAD element 6*a* and the power supply voltage Vdd.

The gating switch 15 switches between an on state and an off state, on the basis of the enable signal output from the control unit 8. Specifically, the enable signal is input to the gating switch 15 via the inverter 20.

That is, when the enable signal switches from off to on, the gating switch 15 switches from on to off immediately. Then, the control unit 8 can perform the gating operation of the SPAD element 6*a* by controlling the gating switch 15.

For example, the control unit 8 can set a voltage of the anode of the SPAD element 6*a* to the power supply voltage Vdd by turning on the gating switch 15. As a result, the reverse bias voltage is not applied to the SPAD element 6*a*, so that the control unit 8 can cause the SPAD element 6*a* to enter an invalid state.

On the other hand, the control unit 8 can cause the anode of the SPAD element 6*a* to enter a floating state by turning off the gating switch 15. As a result, the reverse bias voltage can be applied to the SPAD element 6*a*, so that the control unit 8 can cause the SPAD element 6*a* to enter a valid state.

Next, an operation of a pulse output unit 7 according to the second embodiment will be described with reference to FIG. 12 in addition to FIG. 11. FIG. 12 is a timing chart illustrating an operation example of the pulse output unit 7 according to the second embodiment of the present disclosure.

Figure 12:
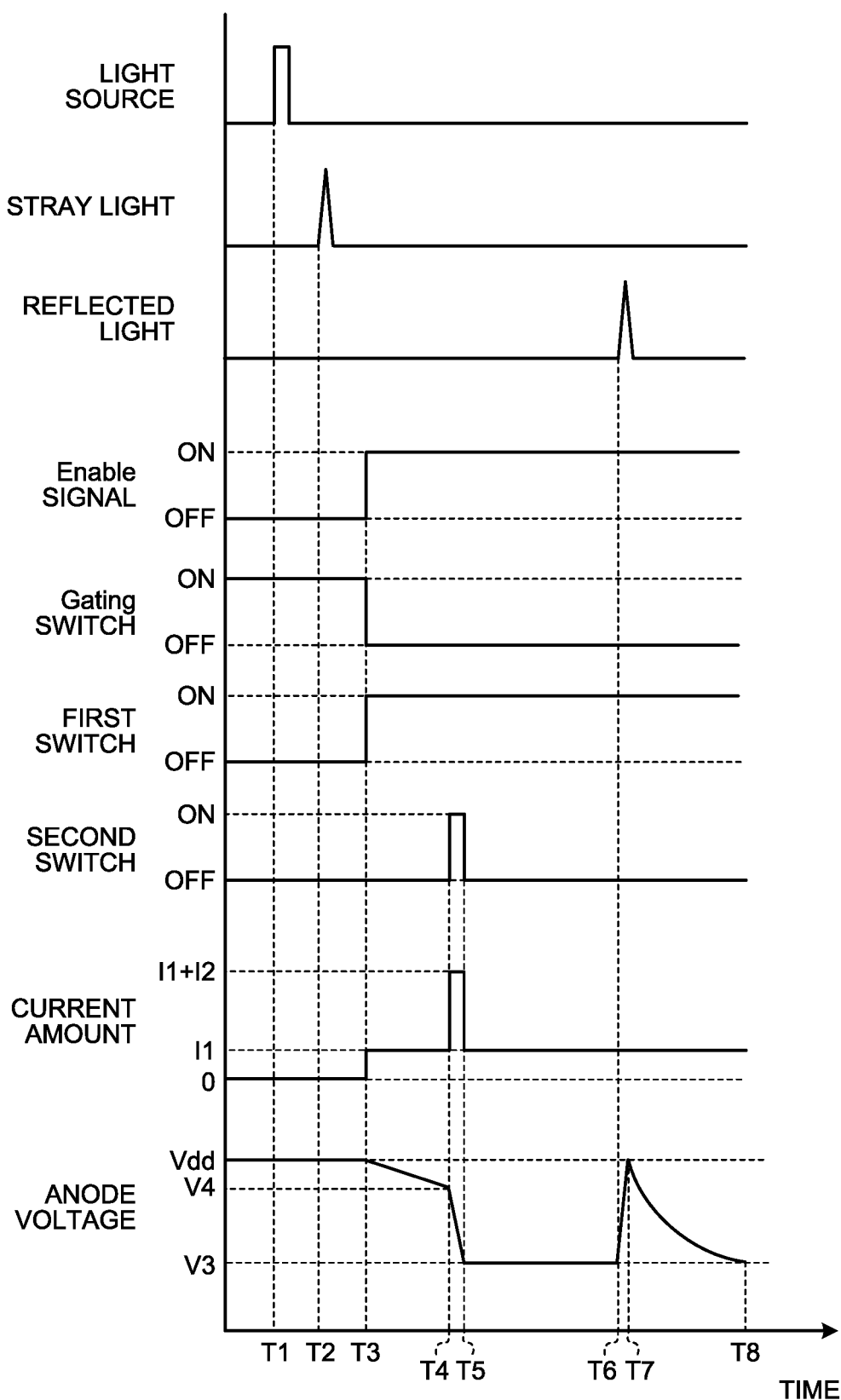
FIG. 12 is a timing chart illustrating an operation example of a pulse output unit according to the second embodiment of the present disclosure.

In the example of FIG. 12, since the enable signal is maintained in an off state in an initial state, the gating switch 15 is maintained in an on state, and the SPAD element 6*a* enters an invalid state.

Then, the control unit 8 controls the light source drive unit 5 to cause the light source 4 to emit light in a pulsed manner at a time T1. As a result, the stray light L3 is incident on the SPAD element 6*a* at a time T2. The stray light L3 is incident on the SPAD element 6*a*, so that electrons are accumulated in the SPAD element 6*a* in the invalid state.

Next, the control unit 8 switches the enable signal from off to on at a time T3 at which a predetermined time has elapsed from the time T1 when the light source 4 emits light.

As a result, the gating switch 15 switches from on to off at time T3, so that the anode of the SPAD element 6a enters a floating state.

Further, the first switch 13 switches from off to on at the time T3. As a result, the current having the current value I1 flows from the anode of the SPAD element 6a by the first constant current source 11, so that an anode voltage of the SPAD element 6a gradually decreases from the power supply voltage Vdd.

As described above, in the second embodiment, after starting the gating operation, the cathode of the SPAD element 6a is stepped down by using one (the first constant current source 11) of the plurality of constant current sources connected in parallel to the anode of the SPAD element 6a.

As a result, a speed at which the anode of the SPAD element 6a is stepped down can be limited. Therefore, according to the second embodiment, since the gating operation can be performed while the electrons accumulated in the SPAD element 6a are eliminated, it is possible to suppress the SPAD element 6a from unintentionally reacting due to the accumulated electrons.

Then, the enable signal sent from the control unit 8 is sent to the second switch 14 via the delay circuit 18 and the pulse generation circuit 19 as described above. As a result, the second switch 14 switches from off to on at a time T4 at which a predetermined delay time has elapsed from the time T3.

Thereby, a current having a current value I1+I2 flows from the anode of the SPAD element 6a by the first constant current source 11 and the second constant current source 12, so that the anode voltage of the SPAD element 6a rapidly decreases from a voltage V4 at a point of time of the time T4.

Then, the voltage reaches a predetermined voltage V3 at a time T5, and the second switch 14 switches from on to off at the time T5. Thereafter, the current having the current value I1 flows from the anode of the SPAD element 6a by the first constant current source 11, so that the anode voltage of the SPAD element 6a is maintained at the voltage V3.

As described above, in the second embodiment, similarly to the first embodiment, the accumulated electrons in the SPAD element 6a can be sufficiently eliminated during a period until the time T4. In other words, in the second embodiment, a time in which the electrons accumulated in the SPAD element 6a can be sufficiently eliminated is set to a delay time set by the delay circuit 18.

Thereby, even if the anode voltage of the SPAD element 6a is rapidly decreased from the time T4, it is possible to suppress the SPAD element 6a from unintentionally reacting.

Further, in the second embodiment, a time until the anode voltage of the SPAD element 6a reaches the voltage V3 can be reduced by stepping down the anode of the SPAD element 6a using any of the plurality of constant current sources from the time T4. That is, in the second embodiment, the gating operation can be completed in a short time.

Therefore, according to the second embodiment, the gating operation of the SPAD element 6a can be performed quickly and properly by connecting the plurality of constant current sources in parallel to the anode of the SPAD element 6a.

Further, in the second embodiment, the current value I1 of the first constant current source 11 may be smaller than the current value I2 of the second constant current source 12. Thereby, it is possible to further limit the stepping-down speed of the anode of the SPAD element 6a until the time T4 when the second switch 14 is turned on. Further, from the time T4 when the second switch 14 is turned on, the anode voltage of the SPAD element 6a can be reduced more rapidly.

Therefore, according to the second embodiment, the gating operation of the SPAD element 6a can be performed more quickly and properly.

Further, in the second embodiment, the control unit 8 may maintain the first switch 13 in the on state during a period until the second switch 14 is switched from off to on (that is, a period until the time T4).

As a result, the anode voltage of the SPAD element 6a can be continuously decreased until the time T4, so that the time until the voltage of the anode of the SPAD element 6a is decreased to the voltage V3 can be reduced. Therefore, according to the second embodiment, the gating operation of the SPAD element 6a can be performed more quickly.

The description of the timing chart after the time T5 will be continued. At the time T5, the reverse bias voltage V3 is applied to the anode of the SPAD element 6a until a state called a Geiger mode occurs, which is just before avalanche amplification occurs.

That is, at the time T5, the signal output from the anode of SPAD element 6a has the voltage V3. Then, since the voltage V3 smaller than a predetermined threshold voltage is input as a signal to the inverter 16, the inverter 16 outputs a high-level signal S1 (refer to FIG. 11).

Then, if one photon caused by the reflected light L2 is incident on the SPAD element 6a to which the voltage V3 is applied at a time T6, the SPAD element 6a breaks down and a current flows to the first constant current source 11.

As a result, the anode voltage of the SPAD element 6a rapidly increases from the voltage V3, and when the anode voltage becomes equal to or larger than the threshold voltage, the inverter 16 outputs the low-level signal S1.

Then, since the avalanche amplification in the SPAD element 6a stops at a time T7, the anode voltage of the SPAD element 6a stops increasing at the power supply voltage Vdd. Further, the anode voltage of the SPAD element 6a decreases when a current is flown by the first constant current source 11 (so-called quenching operation).

Then, if the anode voltage of the SPAD element 6a becomes smaller than the threshold voltage, the inverter 16 outputs the high-level signal S1.

As described above, if the reflected light L2 is incident on the SPAD element 6a, the inverter 16 outputs the pulse signal S1 resulting from the reflected light L2 to the control unit 8. Finally, the anode voltage of the SPAD element 6a returns to the predetermined voltage V3 at a time T8, and the SPAD element 6a returns to the initial state.

Various Modifications

Subsequently, various modifications of the pulse output unit 7 will be described with reference to FIGS. 13 to 20.

Modification of First Embodiment

Figure 13:
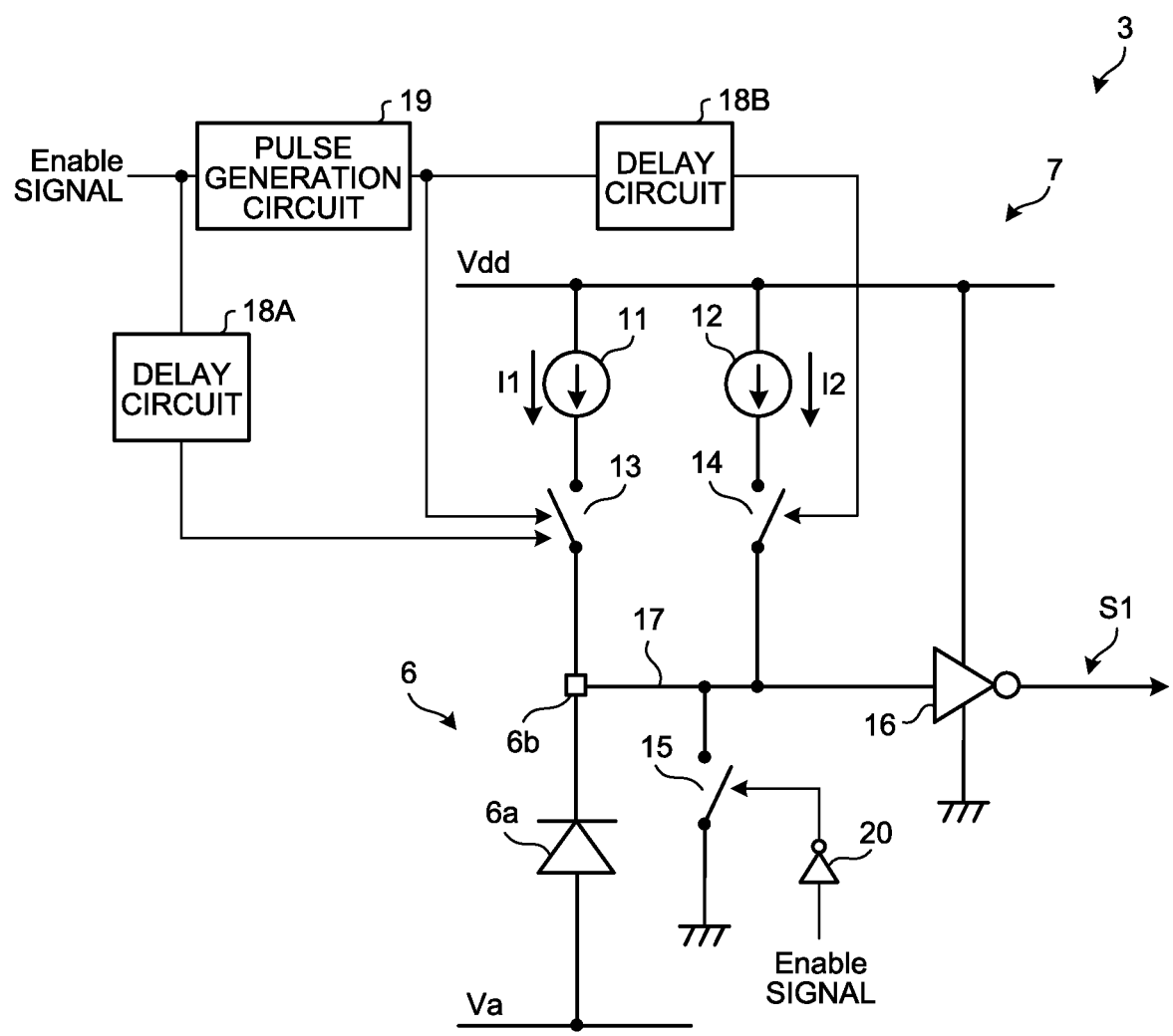
FIG. 13 is a circuit diagram illustrating a configuration example of a pulse output unit according to a modification of the first embodiment of the present disclosure.

FIG. 13 is a circuit diagram illustrating a configuration example of the pulse output unit 7 according to a modification of the first embodiment of the present disclosure. The example of FIG. 13 is different from the first embodiment illustrated in FIG. 7 in a configuration of a path for transmitting the enable signal to the first switch 13 and the second switch 14.

Specifically, the enable signal is input to the first switch 13 via the pulse generation circuit 19, and the enable signal is input to the first switch 13 via the delay circuit 18A.

That is, when the enable signal switches from off to on, the first switch 13 switches from off to on during a predetermined period, and the first switch 13 switches from off to on after a predetermined time elapses.

Further, the enable signal is input to the second switch 14 via the pulse generation circuit 19 and the delay circuit 18B. That is, when the enable signal switches from off to on, the second switch 14 switches from off to on during a predetermined period after a predetermined time elapses.

Figure 14:
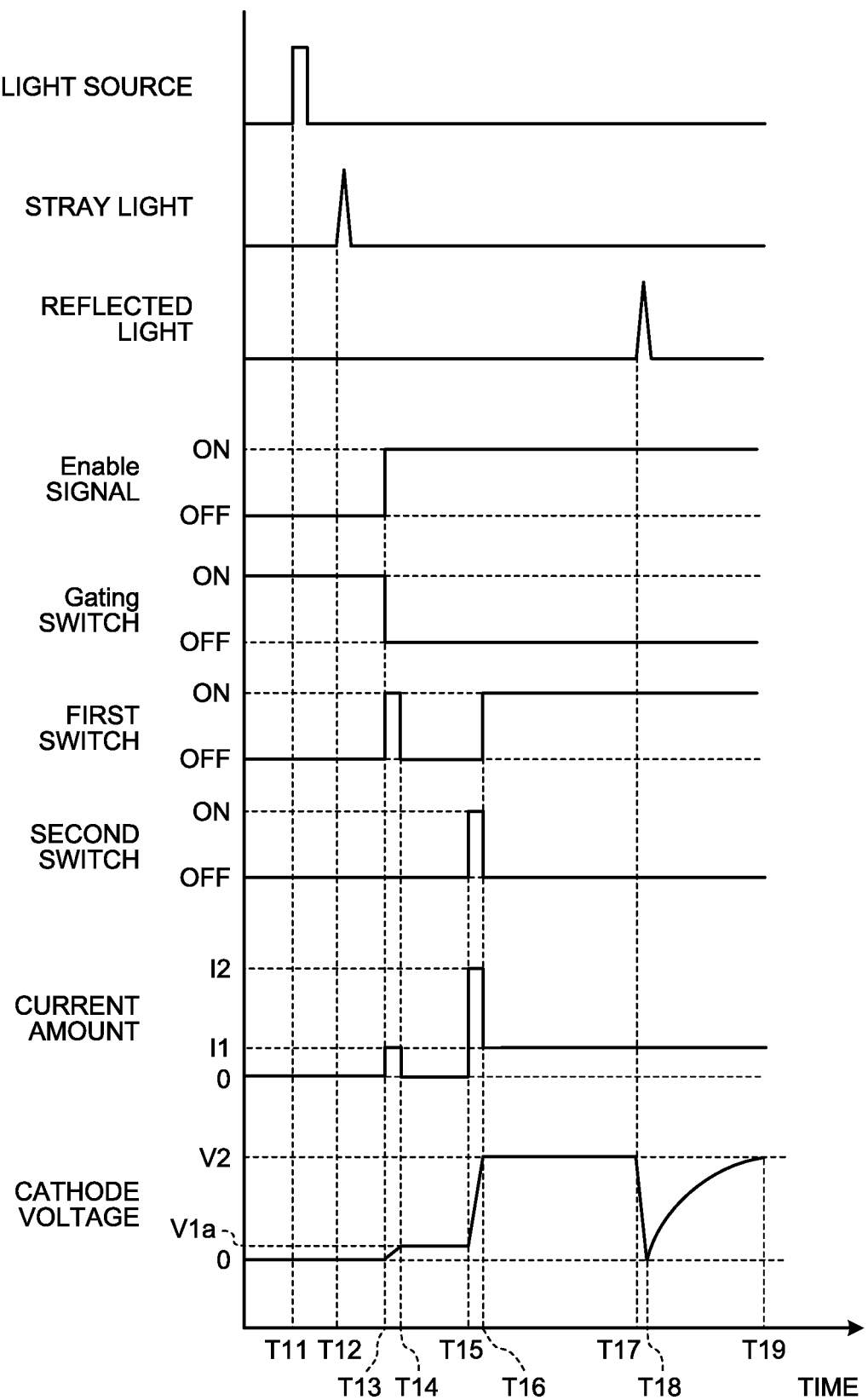
FIG. 14 is a timing chart illustrating an operation example of a pulse output unit according to the modification of the first embodiment of the present disclosure.

Next, the operation of the pulse output unit 7 according to the modification of the first embodiment will be described with reference to FIG. 14 in addition to FIG. 13. FIG. 14 is a timing chart illustrating an operation example of the pulse output unit 7 according to the modification of the first embodiment of the present disclosure.

In the example of FIG. 14, since the enable signal is maintained in an off state in an initial state, the gating switch 15 is maintained in an on state, and the SPAD element 6a enters an invalid state.

Then, the control unit 8 controls the light source drive unit 5 to cause the light source 4 to emit light in a pulsed manner at a time T11. As a result, the stray light L3 is incident on the SPAD element 6a at a time T12. The stray light L3 is incident on the SPAD element 6a, so that electrons are accumulated in the SPAD element 6a in the invalid state.

Next, the control unit 8 switches the enable signal from off to on at a time T13 at which a predetermined time has elapsed from the time T11 when the light source 4 emits light. As a result, the gating switch 15 switches from on to off at the time T13, so that the cathode of the SPAD element 6a enters a floating state.

Further, the first switch 13 switches from off to on at the time T13. As a result, the current having the current value I1 is supplied from the first constant current source 11 to the cathode of the SPAD element 6a, so that a cathode voltage of the SPAD element 6a gradually increases from 0 (V).

On the other hand, in this modification, the first switch 13 switches from on to off at a time T14, so that the cathode voltage of the SPAD element 6a becomes constant at a predetermined voltage Via from the time T14.

Then, the enable signal sent from the control unit 8 is sent to the second switch 14 via the pulse generation circuit 19 and the delay circuit 18B as described above. As a result, the second switch 14 switches from off to on at a time T15 at which a predetermined delay time has elapsed from the time T14.

Thereby, the current having the current value I2 is supplied from the second constant current source 12 to the cathode of the SPAD element 6a, so that the cathode voltage of the SPAD element 6a rapidly increases from a voltage Via at a point of time of the time T15. Then, the voltage reaches the predetermined voltage V2 at a time T16, and at the time T16, the second switch 14 switches from on to off.

Further, the enable signal sent from the control unit 8 is sent to the first switch 13 via the delay circuit 18A. Thereby, at the time T16, the first switch 13 switches from off to on. As a result, the current having the current value I1 is supplied from the first constant current source 11 to the cathode of the SPAD element 6a, so that the cathode voltage of the SPAD element 6a is maintained at the voltage V2.

Since the operations at times T17 to T19 described in FIG. 14 are the same as the operations at the times T6 to T8 in the example of FIG. 8, the detailed description will be omitted.

As described above, in the modification of the first embodiment, during the gating operation, the current supply to the SPAD element 6a by the first constant current source 11 is temporarily stopped at the time T14, so that the cathode voltage of the SPAD element 6a is maintained constantly at the voltage Via.

As described above, the cathode voltage is maintained constantly at a voltage higher than 0 (V) and lower than the breakdown voltage (voltage V2) of the SPAD element 6a, so that the electrons accumulated due to the stray light L3 can be discharged properly from the SPAD element 6a.

The reason is as follows. The cathode voltage of the SPAD element 6a is maintained constantly at a voltage close to 0 (V), so that the SPAD element 6a is intentionally broken down small, thereby eliminating the accumulated electrons from the SPAD element 6a due to the breakdown.

Even if the SPAD element 6a is intentionally broken down small, the small breakdown is completed in a short time and the SPAD element 6a returns to a stable state immediately, so that there is almost no adverse effect on the overall gating operation.

Figure 15:
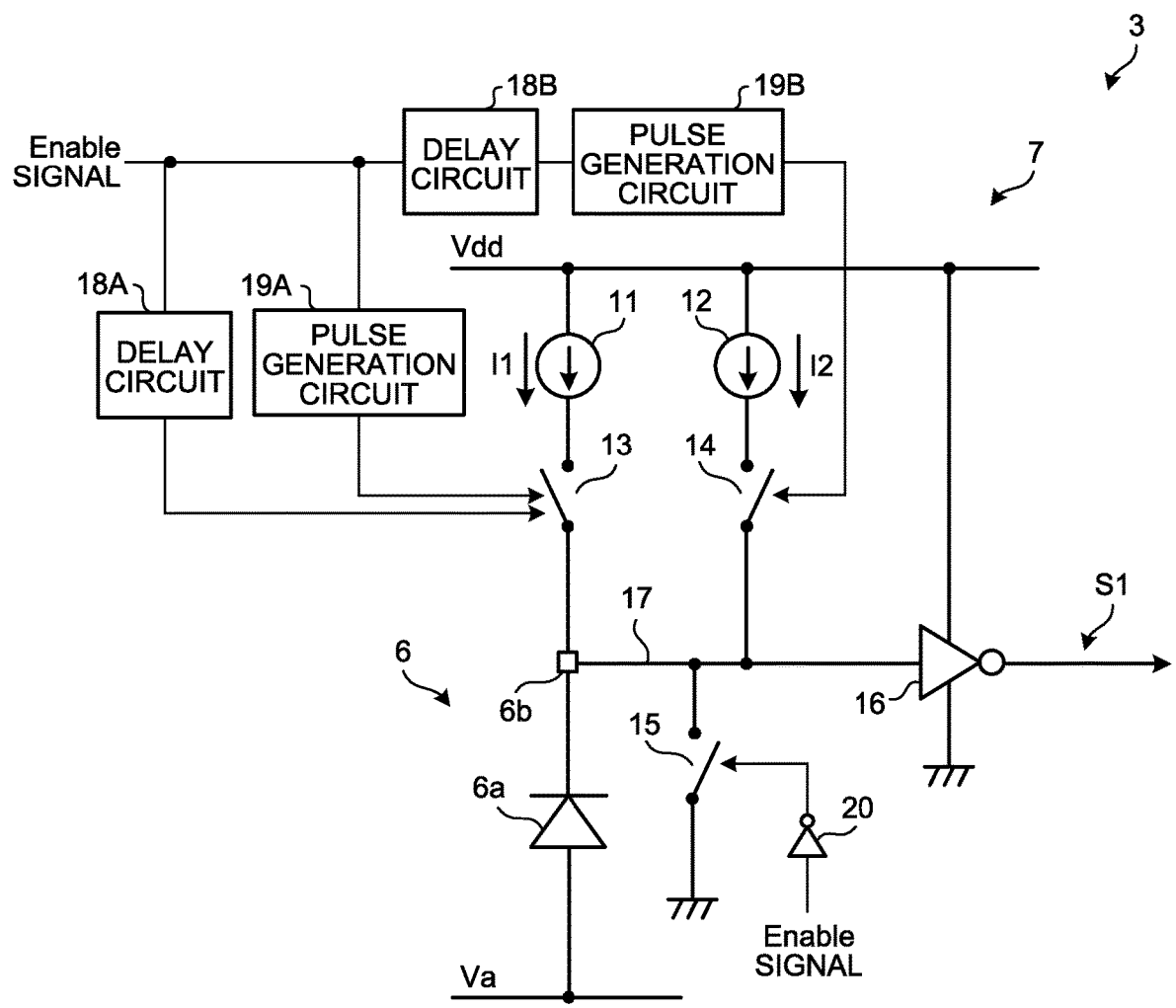
FIG. 15 is a circuit diagram illustrating another configuration example of a pulse output unit according to the modification of the first embodiment of the present disclosure.

The configuration of the transmission path of the enable signal capable of implementing the modification described above is not limited to the example of FIG. 13. FIG. 15 is a circuit diagram illustrating another configuration example of the pulse output unit 7 according to the modification of the first embodiment of the present disclosure.

In the example of FIG. 15, the enable signal is input to the first switch 13 via the pulse generation circuit 19A, and the enable signal is input to the first switch 13 via the delay circuit 18A.

As a result, even in the example of FIG. 15, when the enable signal switches from off to on, the first switch 13 can be switched from off to on during a predetermined period. Further, even in the example of FIG. 15, the first switch 13 can be switched from off to on after a further predetermined time elapses.

Further, the enable signal is input to the second switch 14 via the delay circuit 18B and the pulse generation circuit 19B. As a result, even in the example of FIG. 15, when the enable signal switches from off to on, the second switch 14 can be switched from off to on during a predetermined period after a predetermined time elapses.

In the example of FIG. 15, since the pulses can be generated by the independent pulse generation circuits 19A and 19B, a time for maintaining the first switch 13 in an on state and a time for maintaining the second switch 14 in an on state can be individually controlled. Therefore, according to the example of FIG. 15, the gating operation can be performed more smoothly.

Figure 16:
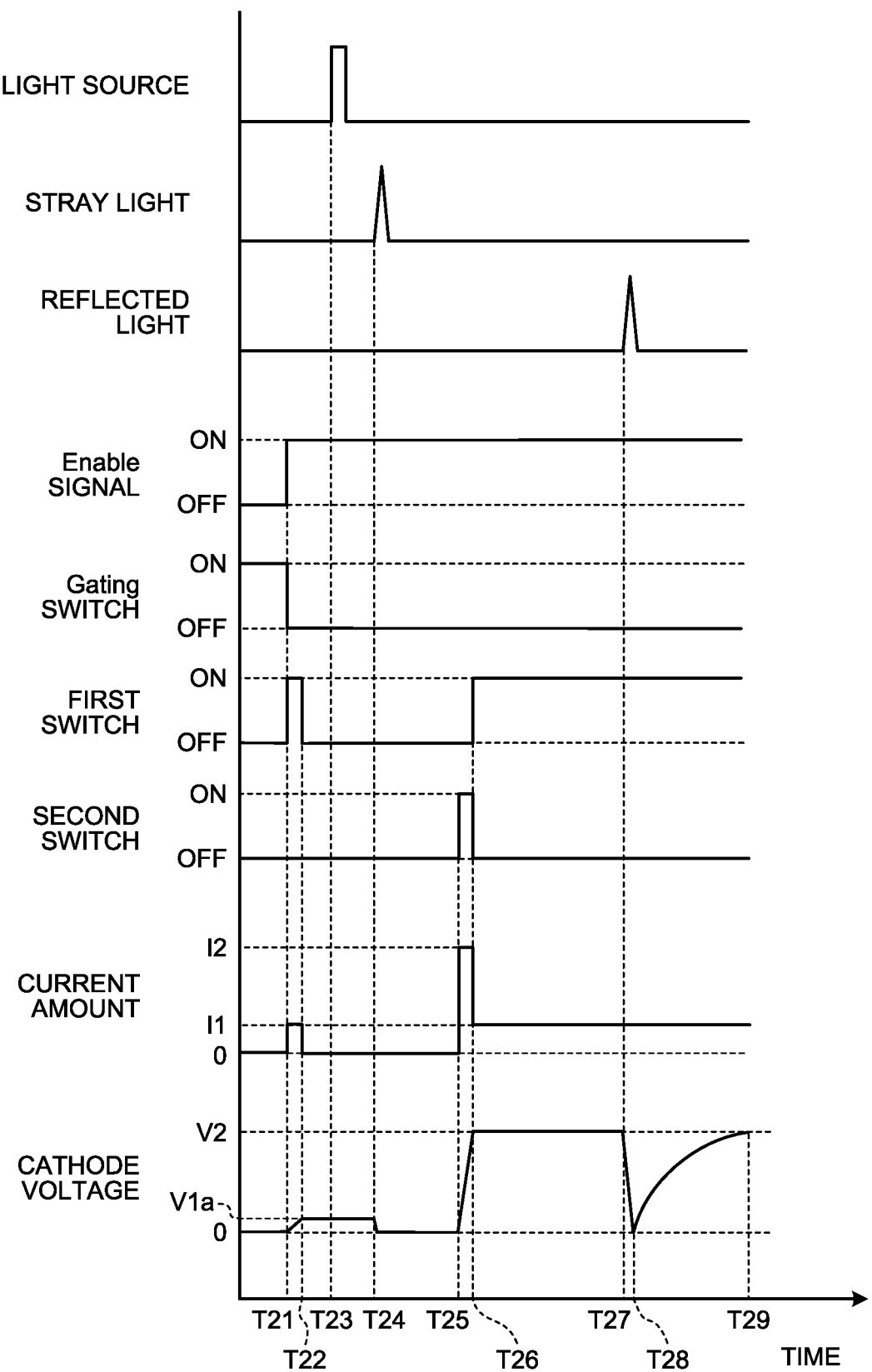
FIG. 16 is a timing chart illustrating another operation example of a pulse output unit according to the modification of the first embodiment of the present disclosure.

Further, in the pulse output unit 7 illustrated in FIGS. 13 and 15, another operation different from the example of FIG. 14 can be performed. FIG. 16 is a timing chart illustrating another operation example of the pulse output unit 7 according to the modification of the first embodiment of the present disclosure.

The example of FIG. 16 is an example in which the gating operation starts before the light source 4 is caused to emit light. First, the control unit 8 switches the enable signal from off to on at a time T21 that is a predetermined time before a time T23 at which the light source 4 is caused to emit light.

As a result, the gating switch 15 switches from on to off at the time T21, so that the cathode of the SPAD element 6a enters a floating state.

Further, the first switch 13 switches from off to on at the time T21. As a result, the current having the current value I1 is supplied from the first constant current source 11 to the cathode of the SPAD element 6a, so that a cathode voltage of the SPAD element 6a gradually increases from 0 (V).

Then, the cathode voltage of the SPAD element 6a becomes constant at the predetermined voltage Via from a time T22.

Then, the control unit 8 controls the light source drive unit 5 to cause the light source 4 to emit light in a pulsed manner at a time T23. As a result, the stray light L3 is incident on the SPAD element 6a at a time T24.

Here, in the example of FIG. 16, since the cathode voltage of the SPAD element 6a already increases to the voltage Via at the time T24 when the stray light L3 is incident, the SPAD element 6a breaks down small, and the cathode voltage of the SPAD element 6a decreases to 0 (V).

As described above, in the example of FIG. 16, the breakdown occurs in the SPAD element 6a due to the stray light L3. Therefore, even when the stray light L3 is incident, electrons caused by the stray light L3 are not accumulated in the SPAD element 6a.

That is, in the example of FIG. 16, the first switch 13 is switched from off to on before the light source 4 is caused to emit light, and the SPAD element 6a is intentionally broke down small by the incidence of the stray light L3. As a result, the accumulation of the electrons due to the stray light L3 can be suppressed.

Therefore, according to the example of FIG. 16, it is possible to suppress the accumulation of the electrons due to the stray light L3 in the SPAD element 6a during the gating operation.

Since the operations at times T25 to T29 illustrated in FIG. 16 are the same as the operations at the times T16 to T19 in the example of FIG. 14, the detailed description will be omitted.

Modification of Second Embodiment

FIG. 13 is a circuit diagram illustrating a configuration example of the pulse output unit 7 according to a modification of the second embodiment of the present disclosure. The example of FIG. 13 is different from the second embodiment illustrated in FIG. 11 in a configuration of a path for transmitting the enable signal to the first switch 13 and the second switch 14.

Specifically, the enable signal is input to the first switch 13 via the pulse generation circuit 19, and the enable signal is input to the first switch 13 via the delay circuit 18A.

That is, when the enable signal switches from off to on, the first switch 13 switches from off to on during a predetermined period, and the first switch 13 switches from off to on after a predetermined time elapses.

Further, the enable signal is input to the second switch 14 via the pulse generation circuit 19 and the delay circuit 18B. That is, when the enable signal switches from off to on, the second switch 14 switches from off to on during a predetermined period after a predetermined time elapses.

Next, the operation of the pulse output unit 7 according to the modification of the second embodiment will be described with reference to FIG. 18 in addition to FIG. 17. FIG. 18 is a timing chart illustrating an operation example of the pulse output unit 7 according to the modification of the second embodiment of the present disclosure.

In the example of FIG. 14, since the enable signal is maintained in an off state in an initial state, the gating switch 15 is maintained in an on state, and the SPAD element 6a enters an invalid state.

Then, the control unit 8 controls the light source drive unit 5 to cause the light source 4 to emit light in a pulsed manner at a time T11. As a result, the stray light L3 is incident on the SPAD element 6a at a time T12. The stray light L3 is incident on the SPAD element 6a, so that electrons are accumulated in the SPAD element 6a in the invalid state.

Next, the control unit 8 switches the enable signal from off to on at a time T13 at which a predetermined time has elapsed from the time T11 when the light source 4 emits light. As a result, the gating switch 15 switches from on to off at the time T13, so that the anode of the SPAD element 6a enters a floating state.

Further, the first switch 13 switches from off to on at the time T13. As a result, the current having the current value I1 flows from the anode of the SPAD element 6a to the first constant current source 11, so that the anode voltage of the SPAD element 6a gradually decreases from the power supply voltage Vdd.

On the other hand, in this modification, the first switch 13 switches from on to off at the time T14, so that the anode voltage of the SPAD element 6a becomes constant at a predetermined voltage V4a from the time T14.

Then, the enable signal sent from the control unit 8 is sent to the second switch 14 via the pulse generation circuit 19 and the delay circuit 18B as described above. As a result, the second switch 14 switches from off to on at a time T15 at which a predetermined delay time has elapsed from the time T14.

As a result, the current having the current value I2 flows from the anode of the SPAD element 6a to the second constant current source 12, so that the anode voltage of the SPAD element 6a rapidly decreases from the voltage V4a at a point of time of the time T15. Then, the voltage reaches the predetermined voltage V3 at the time T16, and the second switch 14 switches from on to off at the time T16.

Further, the enable signal sent from the control unit 8 is sent to the first switch 13 via the delay circuit 18A. Thereby, at the time T16, the first switch 13 switches from off to on. As a result, the current having the current value I1 flows from the anode of the SPAD element 6a to the first constant current source 11, so that the anode voltage of the SPAD element 6a is maintained at the voltage V3.

Since the operations at the times T17 to T19 described in FIG. 18 are the same as the operations at the times T6 to T8 in the example of FIG. 12, the detailed description will be omitted.

As described above, in the modification of the second embodiment, during the gating operation, the current emission from the SPAD element 6a by the first constant current source 11 is temporarily stopped at the time T14, so that the anode voltage of the SPAD element 6a is maintained constantly at the voltage V4a.

As described above, the anode voltage is maintained constantly at a voltage lower than the power supply voltage Vdd and higher than the breakdown voltage (voltage V3) of the SPAD element 6a, so that the electrons accumulated due to the stray light L3 can be discharged properly from the SPAD element 6a.

The reason is as follows. The anode voltage of the SPAD element 6a is maintained constantly at a voltage close to the power supply voltage Vdd, so that the SPAD element 6a is intentionally broken down small, thereby eliminating the accumulated electrons from the SPAD element 6a due to the breakdown.

Even if the SPAD element 6a is intentionally broken down small, the small breakdown is completed in a short time and the SPAD element 6a returns to a stable state immediately, so that there is almost no adverse effect on the overall gating operation.

Figure 19:
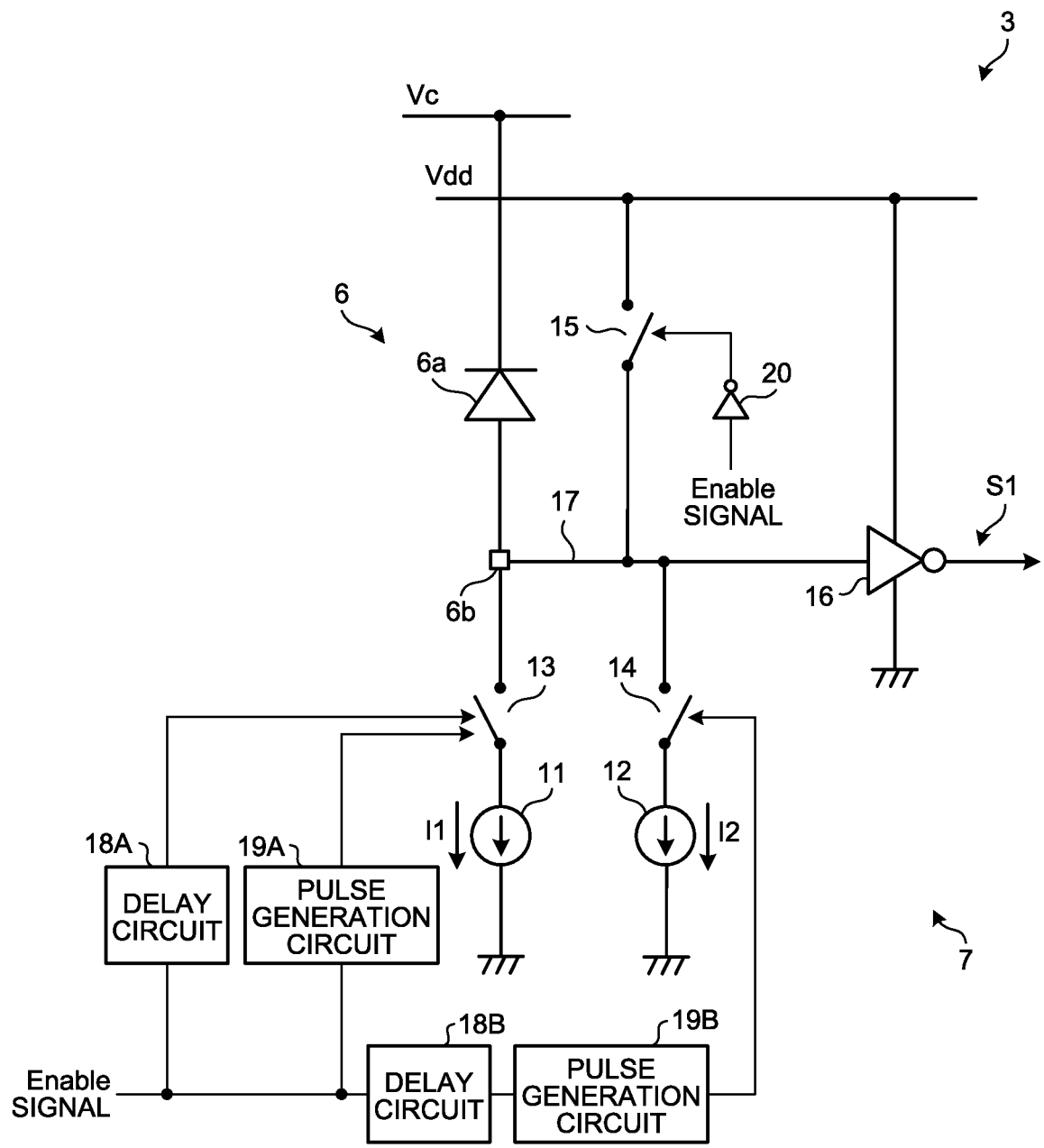
FIG. 19 is a circuit diagram illustrating another configuration example of a pulse output unit according to the modification of the second embodiment of the present disclosure.

The configuration of the transmission path of the enable signal capable of implementing the modification described above is not limited to the example of FIG. 17. FIG. 19 is a circuit diagram illustrating another configuration example of the pulse output unit 7 according to the modification of the second embodiment of the present disclosure.

In the example of FIG. 19, the enable signal is input to the first switch 13 via the pulse generation circuit 19A, and the enable signal is input to the first switch 13 via the delay circuit 18A.

As a result, even in the example of FIG. 19, when the enable signal switches from off to on, the first switch 13 can be switched from off to on during a predetermined period. Further, even in the example of FIG. 19, the first switch 13 can be switched from off to on after a further predetermined time elapses.

Further, the enable signal is input to the second switch 14 via the delay circuit 18B and the pulse generation circuit 19B. As a result, even in the example of FIG. 19, when the enable signal switches from off to on, the second switch 14 can be switched from off to on during a predetermined period after a predetermined time elapses.

In the example of FIG. 19, since the pulses can be generated by the independent pulse generation circuits 19A and 19B, a time for maintaining the first switch 13 in an on state and a time for maintaining the second switch 14 in an on state can be individually controlled. Therefore, according to the example of FIG. 19, the gating operation can be performed more smoothly.

Figure 17:
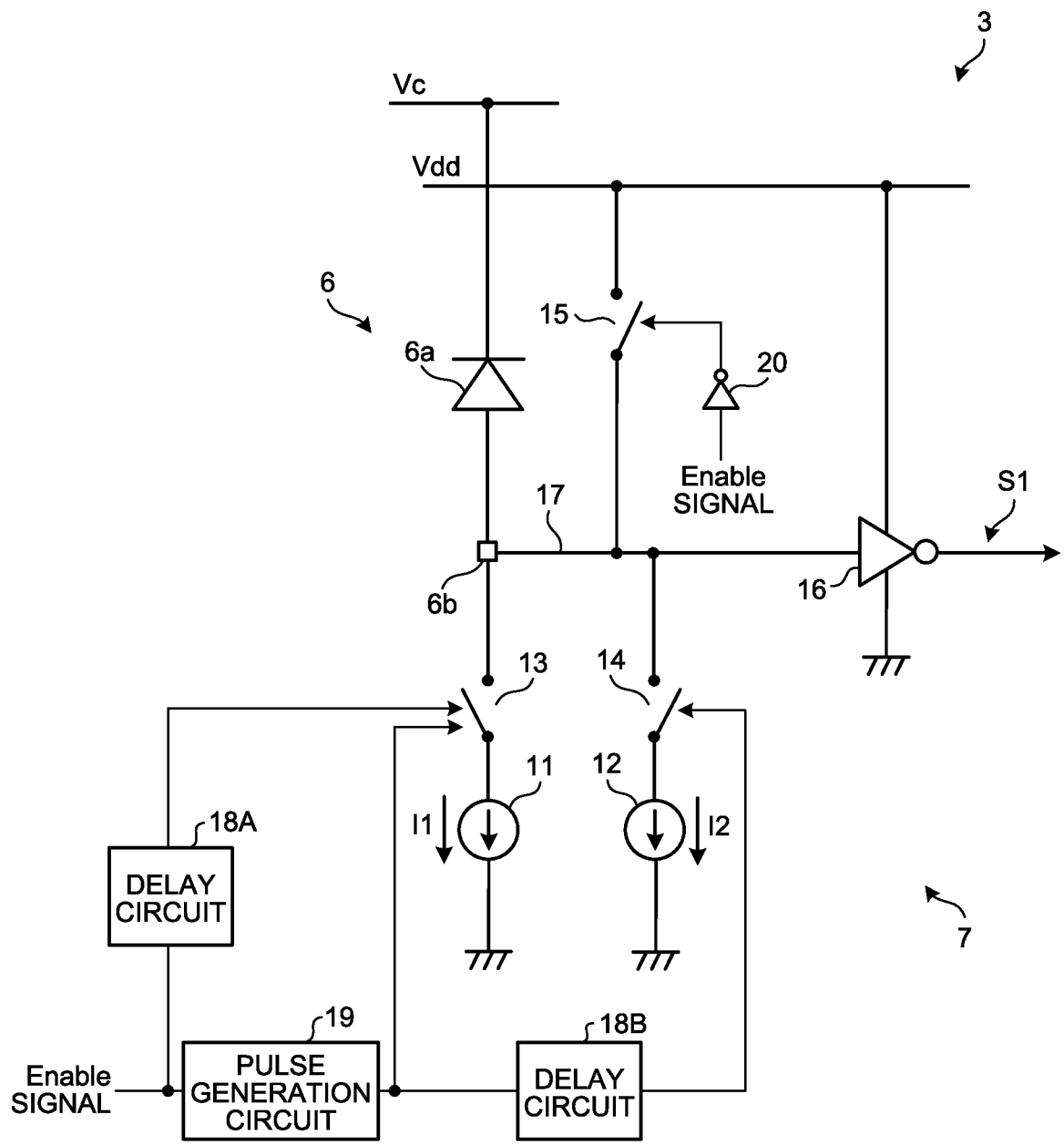
FIG. 17 is a circuit diagram illustrating a configuration example of a pulse output unit according to a modification of the second embodiment of the present disclosure.
Figure 18:
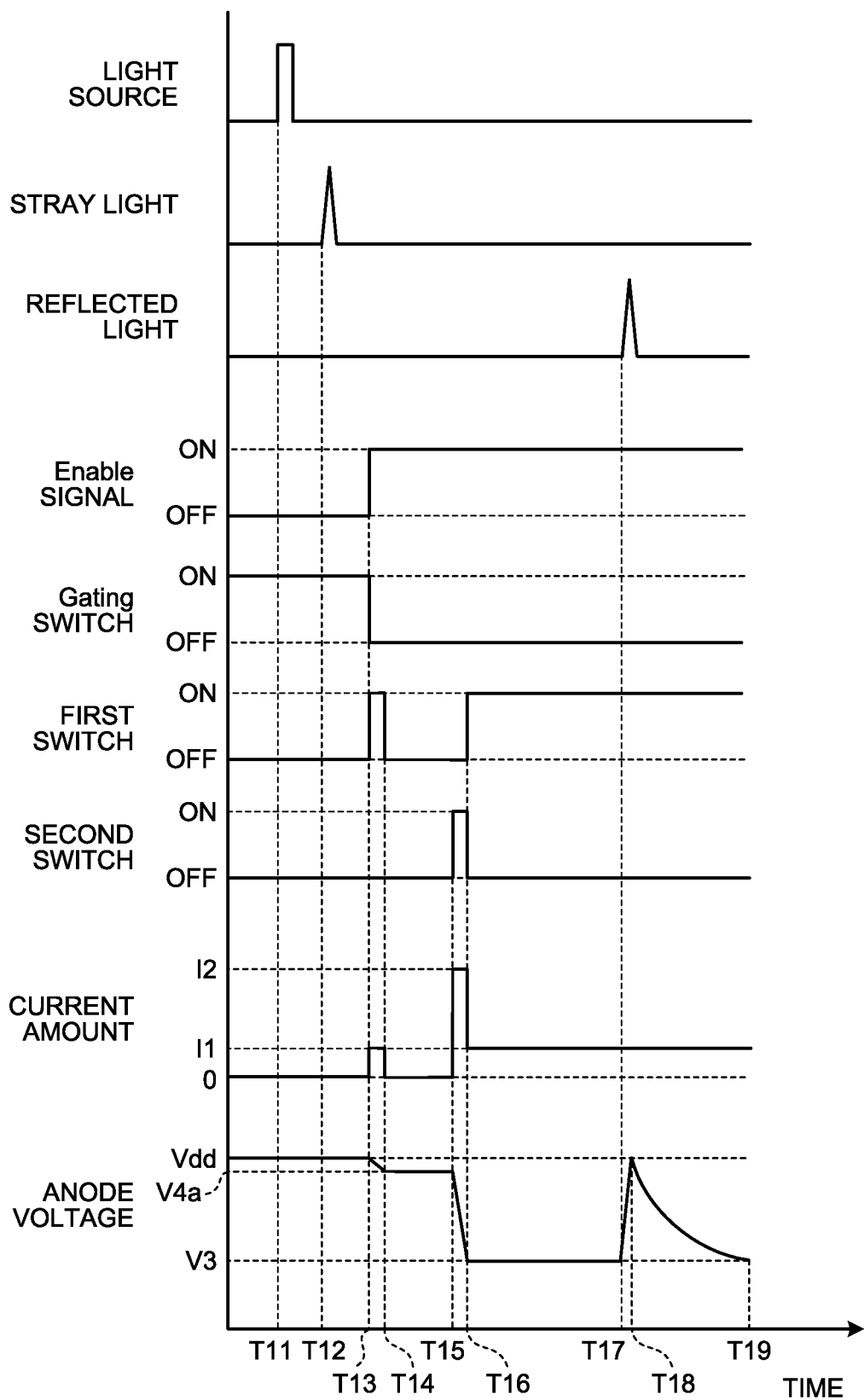
FIG. 18 is a timing chart illustrating an operation example of a pulse output unit according to the modification of the second embodiment of the present disclosure.
Figure 20:
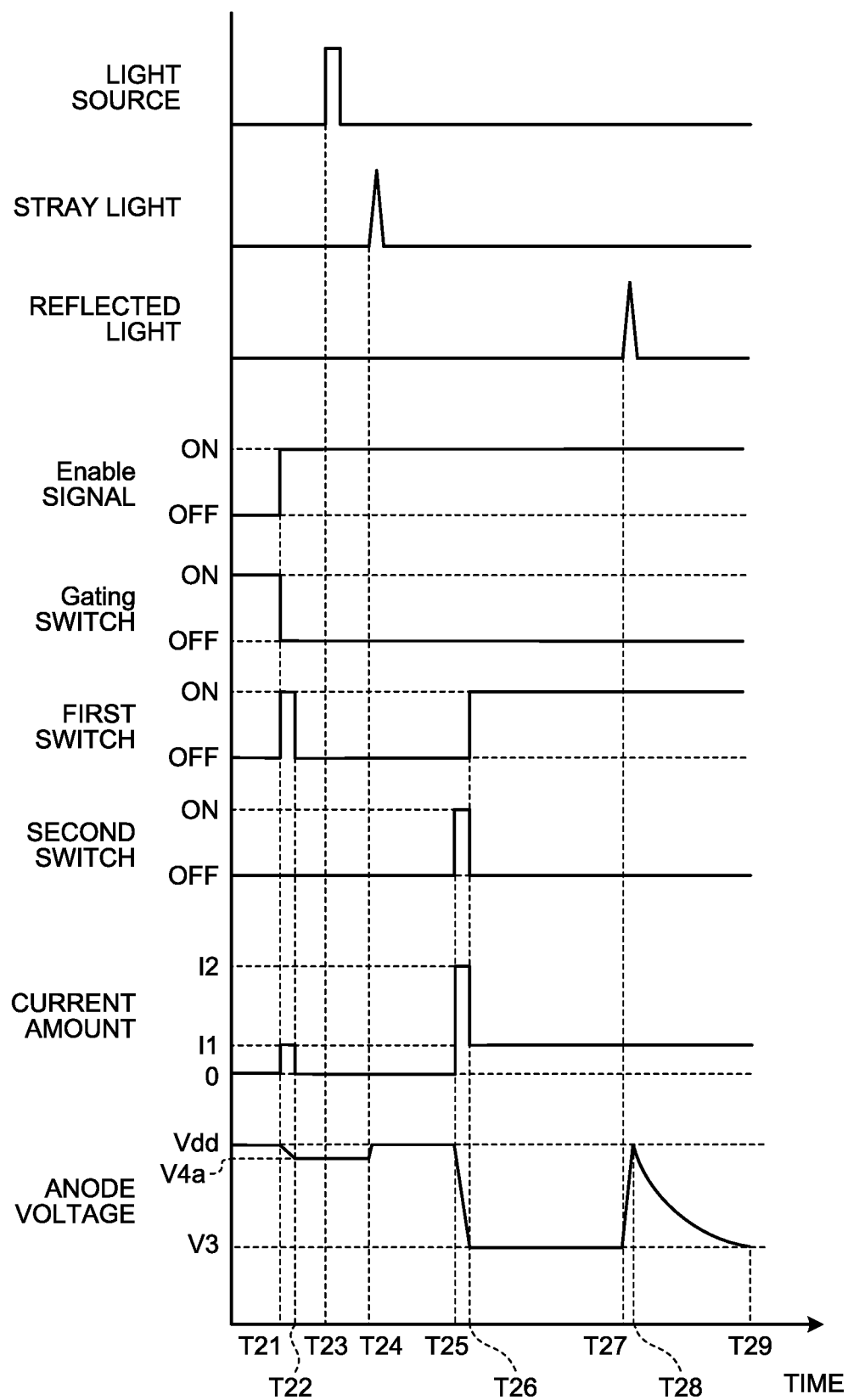
FIG. 20 is a timing chart illustrating another operation example of a pulse output unit according to the modification of the second embodiment of the present disclosure.

Further, in the pulse output unit 7 illustrated in FIGS. 17 and 19, an operation different from the example of FIG. 18 can also be performed. FIG. 20 is a timing chart illustrating another operation example of the pulse output unit 7 according to the modification of the second embodiment of the present disclosure.

The example of FIG. 20 is an example in which the gating operation starts before the light source 4 is caused to emit light. First, the control unit 8 switches the enable signal from off to on at a time T21 that is a predetermined time before a time T23 at which the light source 4 is caused to emit light.

As a result, the gating switch 15 switches from on to off at the time T21, so that the anode of the SPAD element 6a enters a floating state.

Further, the first switch 13 switches from off to on at the time T21. As a result, the current having the current value I1 flows from the anode of the SPAD element 6a to the first constant current source 11, so that the anode voltage of the SPAD element 6a gradually decreases from the power supply voltage Vdd. Then, the anode voltage of the SPAD element 6a becomes constant at the predetermined voltage V4a from the time T22.

Then, the control unit 8 controls the light source drive unit 5 to cause the light source 4 to emit light in a pulsed manner at a time T23. As a result, the stray light L3 is incident on the SPAD element 6a at a time T24.

Here, in the example of FIG. 20, since the anode voltage of the SPAD element 6a already decreases to the voltage V4a at the time T24 when the stray light L3 is incident, the SPAD element 6a breaks down small, and the anode voltage of the SPAD element 6a increases to the power supply voltage Vdd.

As described above, in the example of FIG. 20, the breakdown occurs in the SPAD element 6a due to the stray light L3. Therefore, even when the stray light L3 is incident, electrons caused by the stray light L3 are not accumulated in the SPAD element 6a.

That is, in the example of FIG. 20, the first switch 13 is switched from off to on before the light source 4 is caused to emit light, and the SPAD element 6a is intentionally broke down small by the incidence of the stray light L3. As a result, the accumulation of the electrons due to the stray light L3 can be suppressed.

Therefore, according to the example of FIG. 20, it is possible to suppress the accumulation of the electrons due to the stray light L3 in the SPAD element 6a during the gating operation.

Since the operations at the times T25 to T29 described in FIG. 20 are the same as the operations at the times T16 to T19 in the example of FIG. 18, the detailed description will be omitted.

Effects

The distance measurement sensor 1 according to the first embodiment includes the single photon avalanche diode (SPAD) element 6a, the first constant current source 11 and the second constant current source 12, the first switch 13, the second switch 14, and the gating switch 15. The SPAD element 6a outputs the signal S1 at the time of receiving light (reflected light L2) reflected from the measured object X due to the light L1 emitted from the light source 4. The first constant current source 11 and the second constant current source 12 are connected in parallel to the cathode of the SPAD element 6a. The first switch 13 is connected between the SPAD element 6a and the first constant current source 11. The second switch 14 is connected between the SPAD element 6a and the second constant current source 12. The gating switch 15 is connected between the SPAD element 6a and the first switch 13 and between the SPAD element 6a and the ground potential.

As a result, the gating operation of the SPAD element 6a can be performed quickly and properly.

The distance measurement sensor 1 according to the second embodiment includes the single photon avalanche diode (SPAD) element 6a, the first constant current source 11 and the second constant current source 12, the first switch 13, the second switch 14, and the gating switch 15. The SPAD element 6a outputs the signal S1 at the time of receiving light (reflected light L2) reflected from the measured object X due to the light L1 emitted from the light source 4. The first constant current source 11 and the second constant current source 12 are connected in parallel to the anode of the SPAD element 6a. The first switch 13 is connected between the SPAD element 6a and the first constant current source 11. The second switch 14 is connected between the SPAD element 6a and the second constant current source 12. The gating switch 15 is connected between the SPAD element 6a and the first switch 13 and between the SPAD element 6a and the power supply voltage Vdd.

As a result, the gating operation of the SPAD element 6a can be performed quickly and properly.

The distance measurement sensor 1 according to each embodiment further includes the light source 4 and the control unit 8. The light source 4 irradiates the measured object X with the light (emitted light L1). The control unit 8 controls the light source 4, the first switch 13, the second switch 14, and the gating switch 15. Then, the control unit 8 switches the gating switch 15 from on to off in synchronization with the light emission operation of the light source 4.

As a result, since the SPAD element 6a can be reacted with the reflected light L2 from the measured object X without reacting the SPAD element 6a with the stray light L3, the distance D to the measured object X can be measured with high accuracy.

Further, in the distance measurement sensor 1 according to each embodiment, the control unit 8 switches the first switch 13 from off to on in synchronization with the off operation of the gating switch 15. Further, after switching the first switch 13 from off to on, the control unit 8 switches the second switch 14 from off to on.

As a result, the gating operation of the SPAD element 6a can be performed quickly and properly.

Further, in the distance measurement sensor 1 according to each embodiment, the control unit 8 maintains the first switch 13 in the on state during the period until the second switch 14 is switched from off to on.

Thereby, the gating operation of the SPAD element 6a can be performed more quickly.

Further, in the distance measurement sensor 1 according to each embodiment, the control unit 8 switches the first switch 13 from on to off during the period until the second switch 14 is switched from off to on.

Thereby, electrons accumulated due to the stray light L3 can be discharged properly from the SPAD element 6a.

Further, in the distance measurement sensor 1 according to each embodiment, the control unit 8 switches the gating switch 15 from on to off before causing the light source 4 to emit light.

Thereby, it is possible to suppress the accumulation of the electrons due to the stray light L3 in the SPAD element 6a during the gating operation.

Further, in the distance measurement sensor 1 according to each embodiment, the current value I1 of the first constant current source 11 is smaller than the current value I2 of the second constant current source.

Thereby, the gating operation of the SPAD element 6a can be performed more quickly and properly.

Example of Application to Mobile Object

The technology according to the present disclosure (present technology) can be applied to various products. For example, the technology according to the present disclosure may be realized as a device that is mounted on any type of mobile object such as an automobile, an electric vehicle, a hybrid electric vehicle, a motorcycle, a bicycle, personal mobility, an airplane, a drone, a ship, and a robot.

Figure 21:
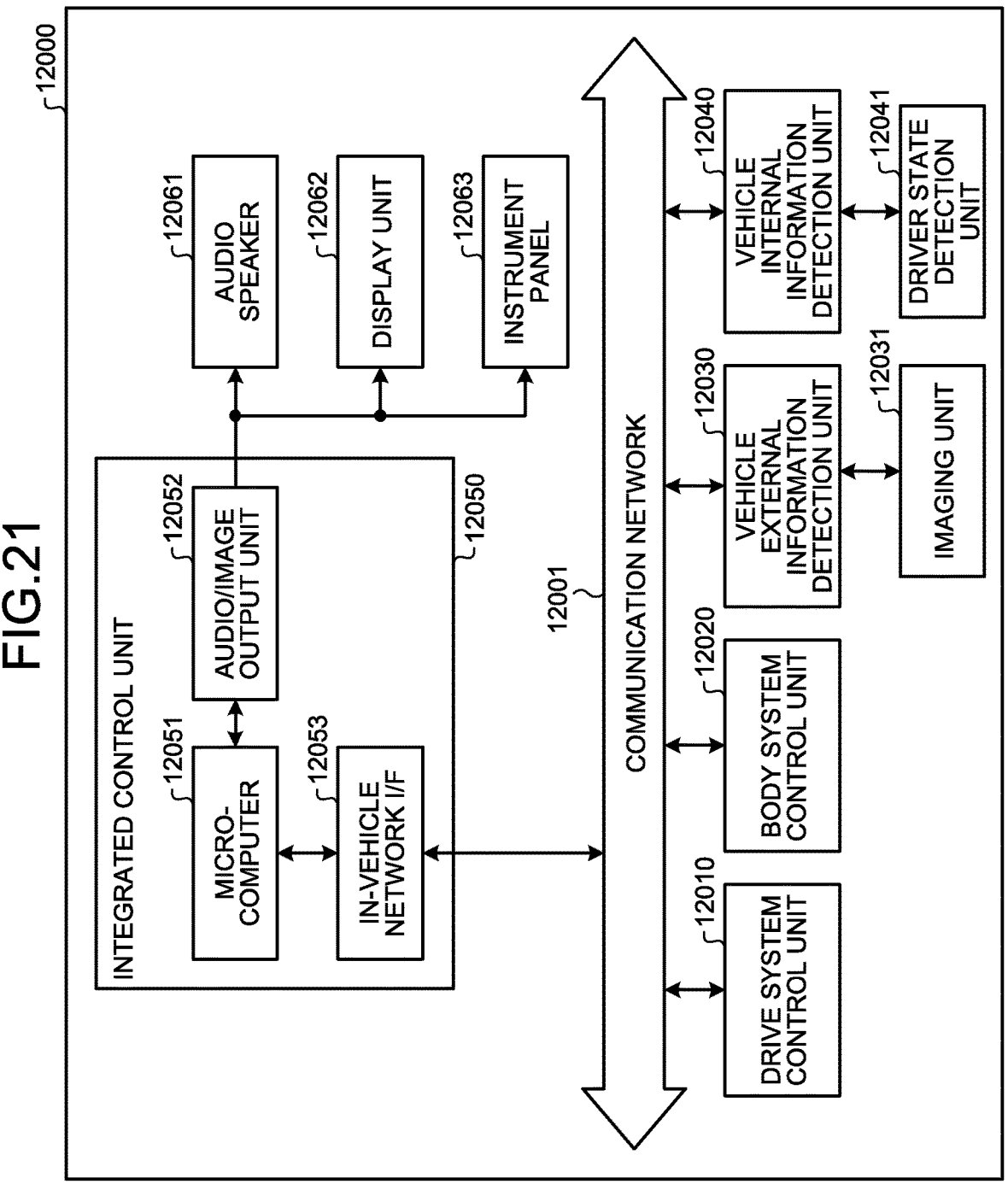
FIG. 21 is a block diagram illustrating an example of a schematic configuration of a vehicle control system.

FIG. 21 is a block diagram illustrating a schematic configuration example of a vehicle control system that is an example of a mobile object control system to which the technology according to the present disclosure can be applied.

A vehicle control system 12000 includes a plurality of electronic control units connected via a communication network 12001. In the example illustrated in FIG. 21, the vehicle control system 12000 includes a drive system control unit 12010, a body system control unit 12020, a vehicle external information detection unit 12030, a vehicle internal information detection unit 12040, and an integrated control unit 12050. Further, as a functional configuration of the integrated control unit 12050, a microcomputer 12051, an audio/image output unit 12052, and an in-vehicle network interface (I/F) 12053 are illustrated.

The drive system control unit 12010 controls operations of devices related to a drive system of a vehicle, according to various programs. For example, the drive system control unit 12010 functions as a control device such as a drive force generation device for generating a drive force of the vehicle, such as an internal combustion engine or a drive motor, a drive force transmission mechanism for transmitting the drive force to wheels, a steering mechanism for adjusting a steering angle of the vehicle, and a braking device for generating a braking force of the vehicle.

The body system control unit 12020 controls operations of various devices mounted on a vehicle body, according to various programs. For example, the body system control unit 12020 functions as a control device of a keyless entry system, a smart key system, a power window device, or various lamps such as a head lamp, a back lamp, a brake lamp, a blinker, or a fog lamp. In this case, radio waves or various switch signals transmitted from a portable device that replaces a key can be input to the body system control unit 12020. The body system control unit 12020 receives the input of these radio waves or signals, and controls a door lock device, a power window device, a lamp, and the like of the vehicle.

The vehicle external information detection unit 12030 detects external information of the vehicle on which the vehicle control system 12000 is mounted. For example, an imaging unit 12031 is connected to the vehicle external information detection unit 12030. The vehicle external information detection unit 12030 causes the imaging unit 12031 to image a vehicle external image, and receives the imaged image. The vehicle external information detection unit 12030 may perform object detection processing or distance detection processing of a person, a vehicle, an obstacle, a sign, a character on a road surface, or the like on the basis of the received image.

The imaging unit 12031 is an optical sensor that receives light and outputs an electrical signal corresponding to an amount of received light. The imaging unit 12031 can output the electrical signal as an image or can output the electrical signal as distance measurement information. Further, the light received by the imaging unit 12031 may be visible light or may be invisible light such as infrared rays.

The vehicle internal information detection unit 12040 detects vehicle internal information. For example, a driver state detection unit 12041 that detects a state of a driver is connected to the vehicle internal information detection unit 12040. The driver state detection unit 12041 includes, for example, a camera that images the driver, and the vehicle internal information detection unit 12040 may calculate a fatigue degree or a concentration degree of the driver or may determine whether or not the driver is asleep, on the basis of the detection information input from the driver state detection unit 12041.

The microcomputer 12051 can calculate a control target value of the drive force generation device, the steering mechanism, or the braking device, on the basis of the vehicle internal information or the vehicle external information acquired by the vehicle external information detection unit 12030 or the vehicle internal information detection unit 12040, and can output a control command to the drive system control unit 12010. For example, the microcomputer 12051 can perform cooperative control for the purpose of realizing functions of an advanced driver assistance system (ADAS) including vehicle collision avoidance or vehicle impact mitigation, following travelling based on an inter-vehicle distance, vehicle speed maintenance travelling, vehicle collision warning or vehicle lane departure warning, and the like.

Further, the microcomputer 12051 controls the drive force generation device, the steering mechanism, the braking device, or the like on the basis of information around the vehicle acquired by the vehicle external information detection unit 12030 or the vehicle internal information detection unit 12040, thereby performing cooperative control for the purpose of automatic driving that autonomously travels without depending on the operation of the driver.

Further, the microcomputer 12051 can output a control command to the body system control unit 12020, on the basis of the vehicle external information acquired by the vehicle external information detection unit 12030. For example, the microcomputer 12051 controls a head lamp according to a position of a preceding vehicle or an oncoming vehicle detected by the vehicle external information detection unit 12030, thereby performing cooperative control for the purpose of preventing glare such as switching from a high beam to a low beam.

The audio/image output unit 12052 transmits an output signal of at least one of audio and image to output devices capable of visually or audibly providing information to a vehicle occupant or the outside of the vehicle. In the example of FIG. 21, an audio speaker 12061, a display unit 12062, and an instrument panel 12063 are illustrated as the output devices. The display unit 12062 may include at least one of an on-board display and a head-up display, for example.

Figure 22:
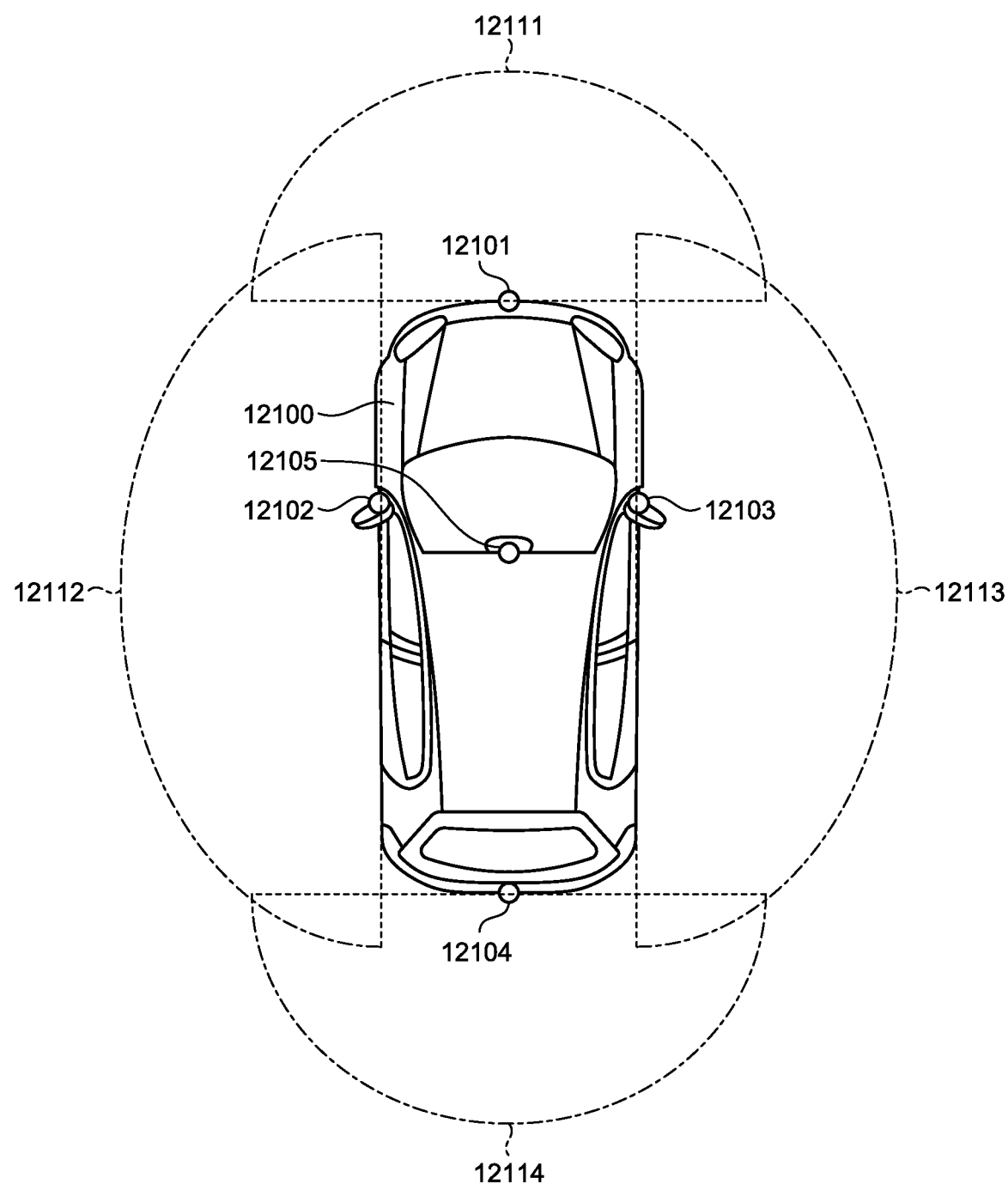
FIG. 22 is a diagram illustrating an example of installation positions of a vehicle external information detection unit and an imaging unit.

FIG. 22 is a diagram illustrating an example of an installation position of the imaging unit 12031.

In FIG. 22, the imaging unit 12031 has imaging units 12101, 12102, 12103, 12104, and 12105.

The imaging units 12101, 12102, 12103, 12104, and 12105 are provided, for example, at positions of a vehicle 12100 such as a front nose, a side mirror, a rear bumper, a back door, and an upper portion of a windshield in a vehicle interior. The imaging unit 12101 provided in the front nose and the imaging unit 12105 provided in the upper part of the windshield in the vehicle interior mainly acquire images in front of the vehicle 12100. The imaging units 12102 and 12103 provided in the side mirror mainly acquire images of the side of the vehicle 12100. The imaging unit 12104 provided in the rear bumper or the back door mainly acquires an image behind the vehicle 12100. The imaging unit 12105 provided in the upper portion of the windshield in the vehicle interior is mainly used for detecting a preceding vehicle or a pedestrian, an obstacle, a traffic light, a traffic sign, a lane, or the like.

FIG. 22 illustrates an example of an imaging range of the imaging units 12101 to 12104. An imaging range 12111 indicates an imaging range of the imaging unit 12101 provided in the front nose, imaging ranges 12112 and 12113 indicate imaging ranges of the imaging units 12102 and 12103 provided in the side mirrors, respectively, and an imaging range 12114 indicates an imaging range of the imaging unit 12104 provided in the rear bumper or the back door. For example, image data imaged by the imaging units 12101 to 12104 are superimposed, so that an overhead image when the vehicle 12100 is viewed from the above is obtained.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, the microcomputer 12051 obtains a distance to each three-dimensional object in the imaging ranges 12111 to 12114 and a temporal change of the distance (a relative speed with respect to the vehicle 12100), on the basis of the distance information obtained from the imaging units 12101 to 12104, thereby extracting, as a preceding vehicle, a three-dimensional object travelling at a predetermined speed (for example, 0 km/h or more) in substantially the same direction as the vehicle 12100, in particular, the closest three-dimensional object on a movement path of the vehicle 12100. Further, the microcomputer 12051 can set an inter-vehicle distance to be secured in advance before the preceding vehicle, and can perform automatic brake control (including following stop control), automatic acceleration control (including following start control), and the like. As described above, it is possible to perform the cooperative control for the purpose of the automatic driving or the like that autonomously travels without depending on the operation of the driver.

For example, the microcomputer 12051 classifies three-dimensional object data regarding the three-dimensional objects into other three-dimensional objects such as two-wheeled vehicles, ordinary vehicles, large vehicles, pedestrians, and telephone poles and extracts the data, on the basis of the distance information obtained from the imaging units 12101 to 12104, and can use the data for automatically avoiding obstacles. For example, the microcomputer 12051 identifies obstacles around the vehicle 12100 as obstacles that are visible to the driver of the vehicle 12100 and obstacles that are invisible to the driver. Further, the microcomputer 12051 determines the collision risk indicating the risk of collision with each obstacle, and when the collision risk is equal to or larger than a setting value and there is a possibility of collision, the microcomputer 12051 outputs warning to the driver via the audio speaker 12061 or the display unit 12062 or performs forced deceleration or avoidance steering by the drive system control unit 12010. As a result, the microcomputer 12051 can perform driving assistance for collision avoidance.

At least one of the imaging units 12101 to 12104 may be an infrared camera that detects infrared rays. For example, the microcomputer 12051 determines whether or not a pedestrian exists in the imaged images of the imaging units 12101 to 12104, thereby recognizing the pedestrian. Such pedestrian recognition is performed according to a procedure for extracting feature points in the imaged images of the imaging units 12101 to 12104 as infrared cameras, and a procedure for performing pattern matching processing on a series of feature points indicating an outline of an object to determine whether or not a pedestrian exists, for example. If the microcomputer 12051 determines that the pedestrian exists in the imaged images of the imaging units 12101 to 12104 and recognizes the pedestrian, the audio/image output unit 12052 controls the display unit 12062 so that the recognized pedestrian is superimposed and displayed with a rectangular outline for emphasis. Further, the audio/image output unit 12052 may control the display unit 12062 so as to display an icon or the like indicating the pedestrian at a desired position.

The example of the vehicle control system to which the technology according to the present disclosure can be applied has been described. The technology according to the present disclosure can be applied to the imaging unit 12031 in the configuration described above. Specifically, the distance measurement sensor 1 in FIG. 5 can be applied to the imaging unit 12031. By applying the technology according to the present disclosure to the imaging unit 12031, the gating operation of the SPAD element can be performed quickly and properly.

Although the embodiments of the present disclosure have been described above, the technical scope of the present disclosure is not limited to the above-described embodiments, and various modifications can be made without departing from the spirit of the present disclosure. Further, components in different embodiments and modifications may be appropriately combined.

For example, in each of the above embodiments, the example has been illustrated in which the two constant current sources are connected in parallel to the SPAD element 6a. However, the number of constant current sources connected in parallel to the SPAD element 6a is not limited to two, and three or more constant current sources may be connected in parallel.

Further, the effects described in the present specification are merely examples and are not limited, and other effects may be added.

The present technology can also take the following configurations.

(1)
A distance measurement sensor including:
a single photon avalanche diode (SPAD) element configured to output a signal at the time of receiving light reflected from a measured object due to light emitted from a light source, a first constant current source and a second constant current source connected in parallel to a cathode of the SPAD element;
a first switch connected between the SPAD element and the first constant current source;
a second switch connected between the SPAD element and the second constant current source; and
a gating switch connected between the SPAD element and the first switch and between the SPAD element and a ground potential.

(2)
A distance measurement sensor including:
a single photon avalanche diode (SPAD) element configured to output a signal at the time of receiving light reflected from a measured object due to light emitted from a light source;
a first constant current source and a second constant current source connected in parallel to an anode of the SPAD element;
a first switch connected between the SPAD element and the first constant current source;
a second switch connected between the SPAD element and the second constant current source; and
a gating switch connected between the SPAD element and the first switch and between the SPAD element and a power supply voltage.

(3)
The distance measurement sensor according to (1) or (2), further including:
a light source configured to irradiate the measured object with light; and
a control unit configured to control the light source, the first switch, the second switch, and the gating switch, wherein
the control unit switches the gating switch from on to off in synchronization with a light emission operation of the light source.

(4)
The distance measurement sensor according to (3), wherein
the control unit switches the first switch from off to on in synchronization with an off operation of the gating switch, and
the control unit switches the second switch from off to on after switching the first switch from off to on.

(5)
The distance measurement sensor according to (4), wherein
the control unit maintains the first switch in an on state during a period until the second switch is switched from off to on.

(6)
The distance measurement sensor according to (4), wherein
the control unit switches the first switch from on to off during a period until the second switch is switched from off to on.

(7)
The distance measurement sensor according to any one of (4) to (6), wherein
the control unit switches the gating switch from on to off before causing the light source to emit light.

(8)
The distance measurement sensor according to any one of (1) to (7), wherein
a current value of the first constant current source is smaller than a current value of the second constant current source.

Additionally or alternatively, the present technology can also take the following configurations.

(1')
A light detecting device comprising:
an avalanche photodiode, wherein an electrode of the avalanche photodiode is coupled to a first node;
a first switch coupled to the first node, and coupled to a first potential line via a first current source;
a second switch coupled to the first node, and coupled to the first potential line via a second current source; and
a delay circuit coupled to the first switch and the second switch.

(2')
The light detecting device according to (1'), further comprising a third switch coupled to the first node and to a second potential line.

(3')
The light detecting device according to (1') or (2'), wherein a current value of the first current source is smaller than a current value of the second current source.

(4')
The light detecting device according to any one of (1') to (3'), further comprising control circuitry configured to control the first switch and the second switch.

(5')
The light detecting device according to (4'), wherein the control circuitry is configured to output an enable signal to the first switch and the delay circuit, and the delay circuit is configured to output a delayed enable signal to the second switch.

(6')
The light detecting device according to (5'), wherein the first switch is configured to switch between a conductive state and a disconnected state on the basis of the enable signal, and the second switch is configured to switch between a conductive state and a disconnected state on the basis of the delayed enable signal.

(7')
The light detecting device according to any one of (1') to (6'), comprising:
a first chip including the avalanche photodiode; and
a second chip including the first switch and the second switch.

(8')
The light detecting device according to any one of (1') to (7'), further comprising an inverter coupled to the first potential line and the first node.

(9')
The light detecting device according to any one of (1') to (8'), wherein the electrode is an anode.

(10')
The light detecting device according to any one of (1') to (8'), wherein the electrode is a cathode.

(11')
A method of detecting light, the method comprising:
providing an avalanche photodiode, wherein an electrode of the avalanche photodiode is coupled to a first node;
providing a first switch coupled to the first node, and coupled to a first potential line via a first current source;
providing a second switch coupled to the first node, and coupled to the first potential line via a second current source; and
providing a delay circuit coupled to the first switch and the second switch.

(12')
The method according to (11'), further comprising providing a third switch coupled to the first node and to a second potential line.

(13')
The method according to (11') or (12'), further comprising controlling the first switch and the second switch via a control circuitry.

(14')
The method according to (13'), further comprising outputting an enable signal to the first switch and the delay circuit from the control circuitry, and outputting a delayed enable signal to the second switch from the delay circuit.

(15')
The method according to any one of (11') to (14'), comprising:
providing a first chip including the avalanche photodiode; and
providing a second chip including the first switch and the second switch.

(16')
The method according to any one of (11') to (15'), further comprising providing an inverter coupled to the first potential line and the first node.

(17')
The method according to any one of (11') to (16'), wherein the electrode is an anode.

(18')
The method according to any one of (11') to (17'), wherein the electrode is a cathode.

(19')
A distance measuring system comprising:
a light source device configured to emit a first light; and
a light detecting device configured to receive a second light from an object due to the first light, the light detecting device including:
an avalanche photodiode, wherein an electrode of the avalanche photodiode is coupled to a first node,
a first switch coupled to the first node, and coupled to a first potential line via a first current source,
a second switch coupled to the first node, and coupled to the first potential line via a second current source, and
a delay circuit coupled to the first switch and the second switch.

(20')
The distance measuring system according to (19'), wherein the light detecting device includes a third switch coupled to the first node and to a second potential line.

(21')
The distance measuring system according to (20'), wherein the second switch is configured to switch to a conductive state at a time after the third switch has switched to a disconnected state and before the light detecting device receives the second light.

REFERENCE SIGNS LIST

1 Distance measurement sensor
4 Light source
6a SPAD element
7 Pulse output unit
8 Control unit
11 First constant current source
12 Second constant current source
13 First switch
14 Second switch
15 Gating switch

The invention claimed is:

1. A light detecting device comprising:
an avalanche photodiode, wherein an electrode of the avalanche photodiode is coupled to a first node;
a first switch coupled to the first node, and coupled to a first potential line via a first current source;
a second switch coupled to the first node, and coupled to the first potential line via a second current source;
a delay circuit coupled to the first switch and the second switch; and
a third switch coupled to the first node and to a second potential line.

2. The light detecting device according to claim 1, wherein a current value of the first current source is smaller than a current value of the second current source.

3. A light detecting device comprising:
an avalanche photodiode, wherein an electrode of the avalanche photodiode is coupled to a first node;
a first switch coupled to the first node, and coupled to a first potential line via a first current source;
a second switch coupled to the first node, and coupled to the first potential line via a second current source;
a delay circuit coupled to the first switch and the second switch; and
control circuitry configured to control the first switch and the second switch,
wherein the control circuitry is configured to output an enable signal to the first switch and the delay circuit, and the delay circuit is configured to output a delayed enable signal to the second switch.

4. The light detecting device according to claim 3, wherein the first switch is configured to switch between a conductive state and a disconnected state on the basis of the enable signal, and the second switch is configured to switch between a conductive state and a disconnected state on the basis of the delayed enable signal.

5. The light detecting device according to claim 1, comprising:
a first chip including the avalanche photodiode; and
a second chip including the first switch and the second switch.

6. The light detecting device according to claim 1, further comprising an inverter coupled to the first potential line and the first node.

7. The light detecting device according to claim 1, wherein the electrode is an anode.

8. The light detecting device according to claim 1, wherein the electrode is a cathode.

9. A method of detecting light, the method comprising:
providing an avalanche photodiode, wherein an electrode of the avalanche photodiode is coupled to a first node;
providing a first switch coupled to the first node, and coupled to a first potential line via a first current source;
providing a second switch coupled to the first node, and coupled to the first potential line via a second current source;
providing a delay circuit coupled to the first switch and the second switch; and
providing a third switch coupled to the first node and to a second potential line.

10. A method of detecting light, the method comprising:
providing an avalanche photodiode, wherein an electrode of the avalanche photodiode is coupled to a first node;
providing a first switch coupled to the first node, and coupled to a first potential line via a first current source;
providing a second switch coupled to the first node, and coupled to the first potential line via a second current source;
providing a delay circuit coupled to the first switch and the second switch;
controlling the first switch and the second switch via a control circuitry; and
outputting an enable signal to the first switch and the delay circuit from the control circuitry, and outputting a delayed enable signal to the second switch from the delay circuit.

11. The method according to claim 9, comprising:
providing a first chip including the avalanche photodiode; and
providing a second chip including the first switch and the second switch.

12. The method according to claim 9, further comprising providing an inverter coupled to the first potential line and the first node.

13. The method according to claim 9, wherein the electrode is an anode.

14. The method according to claim 9, wherein the electrode is a cathode.

15. A distance measuring system comprising:
a light source device configured to emit a first light; and
a light detecting device configured to receive a second light from an object due to the first light, the light detecting device including:
an avalanche photodiode, wherein an electrode of the avalanche photodiode is coupled to a first node,
a first switch coupled to the first node, and coupled to a first potential line via a first current source,
a second switch coupled to the first node, and coupled to the first potential line via a second current source,
a delay circuit coupled to the first switch and the second switch, and
a third switch coupled to the first node and to a second potential line.

16. The distance measuring system according to claim 15, wherein the second switch is configured to switch to a conductive state at a time after the third switch has switched to a disconnected state and before the light detecting device receives the second light.

* * * * *